(12) United States Patent
Blancke et al.

(10) Patent No.: US 12,434,006 B2
(45) Date of Patent: Oct. 7, 2025

(54) ASSEMBLY FOR A DRUG DELIVERY DEVICE, DRUG DELIVERY DEVICE AND METHOD FOR PRODUCING A DRUG DELIVERY DEVICE

(71) Applicant: Sanofi, Paris (FR)

(72) Inventors: Stefan Blancke, Frankfurt am Main (DE); Michael Jugl, Frankfurt am Main (DE)

(73) Assignee: Sanofi, Paris (FR)

( * ) Notice: Subject to any disclaimer, the term of this patent is extended or adjusted under 35 U.S.C. 154(b) by 1161 days.

(21) Appl. No.: 17/297,959

(22) PCT Filed: Dec. 2, 2019

(86) PCT No.: PCT/EP2019/083217
§ 371 (c)(1),
(2) Date: May 27, 2021

(87) PCT Pub. No.: WO2020/114929
PCT Pub. Date: Jun. 11, 2020

(65) Prior Publication Data
US 2022/0096755 A1 Mar. 31, 2022

(30) Foreign Application Priority Data
Dec. 4, 2018 (EP) ..................... 18306607

(51) Int. Cl.
*A61M 5/315* (2006.01)
*A61M 5/24* (2006.01)

(52) U.S. Cl.
CPC ...... *A61M 5/31568* (2013.01); *A61M 5/2422* (2013.01); *A61M 5/31551* (2013.01);
(Continued)

(58) Field of Classification Search
CPC ............ A61M 5/31568; A61M 5/2422; A61M 5/31551; A61M 5/31581; A61M 5/31593
See application file for complete search history.

(56) References Cited

U.S. PATENT DOCUMENTS

2004/0068236 A1 4/2004 Moller et al.
2012/0310206 A1\* 12/2012 Kouyoumjian ... A61M 5/31585
604/211
2018/0177952 A1 6/2018 Bengtsson et al.

FOREIGN PATENT DOCUMENTS

CN 1374876 10/2002
CN 105492048 4/2016
(Continued)

OTHER PUBLICATIONS

International Preliminary Report on Patentability in International Appln. No. PCT/EP2019/083217, dated Jun. 17, 2021, 9 pages.
(Continued)

*Primary Examiner* — Dung T Ulsh
(74) *Attorney, Agent, or Firm* — Bond, Schoeneck & King, PLLC

(57) ABSTRACT

An assembly for a drug delivery device comprises: a housing having a proximal end and a distal end, a dose setting and drive mechanism comprising a dose setting member moveable relative to the housing in a dose setting operation from an initial position to a dose set position, the dose setting and drive mechanism further comprising a piston rod displaceable in the distal direction relative to the housing in a dose delivery operation, wherein, during the dose delivery operation, the piston rod is displaced relative to the housing by a displacement distance which is determined by the set dose, a guide track, a tracking member configured to cooperate with the guide track, and a coupling mechanism configured to operatively couple the tracking member to the
(Continued)

dose setting and drive mechanism, wherein the coupling mechanism has a coupled state and a non-coupled state.

23 Claims, 7 Drawing Sheets

(52) U.S. Cl.
CPC .... *A61M 5/31581* (2013.01); *A61M 5/31593* (2013.01); *A61M 2207/00* (2013.01)

(56) References Cited

FOREIGN PATENT DOCUMENTS

| | | |
|---|---|---|
| CN | 106794309 | 5/2017 |
| CN | 107206167 | 9/2017 |
| EP | 1570876 | 9/2005 |
| EP | 1570876 B1 | 12/2009 |
| JP | 2013-506465 A | 2/2013 |
| JP | 2016-530012 A | 9/2016 |
| JP | 2016-530057 A | 9/2016 |
| WO | WO 2001/019434 | 3/2001 |
| WO | WO 2004/078239 | 9/2004 |
| WO | WO 2010/077280 | 7/2010 |
| WO | WO 2011/039233 A1 | 4/2011 |
| WO | WO 2014/033195 | 3/2014 |
| WO | WO 2015/032780 A1 | 3/2015 |
| WO | WO 2015/032782 | 3/2015 |
| WO | WO 2015/040039 A1 | 3/2015 |
| WO | WO 2016/055627 | 4/2016 |
| WO | WO 2016/055631 | 4/2016 |
| WO | WO 2016/083370 | 6/2016 |
| WO | WO 2020/114929 | 6/2020 |

OTHER PUBLICATIONS

PCT International Search Report and Written Opinion in International Application No. PCT/EP2019/083217, dated Dec. 18, 2019, 10 pages.

* cited by examiner

Fig. 3a
Fig. 3b
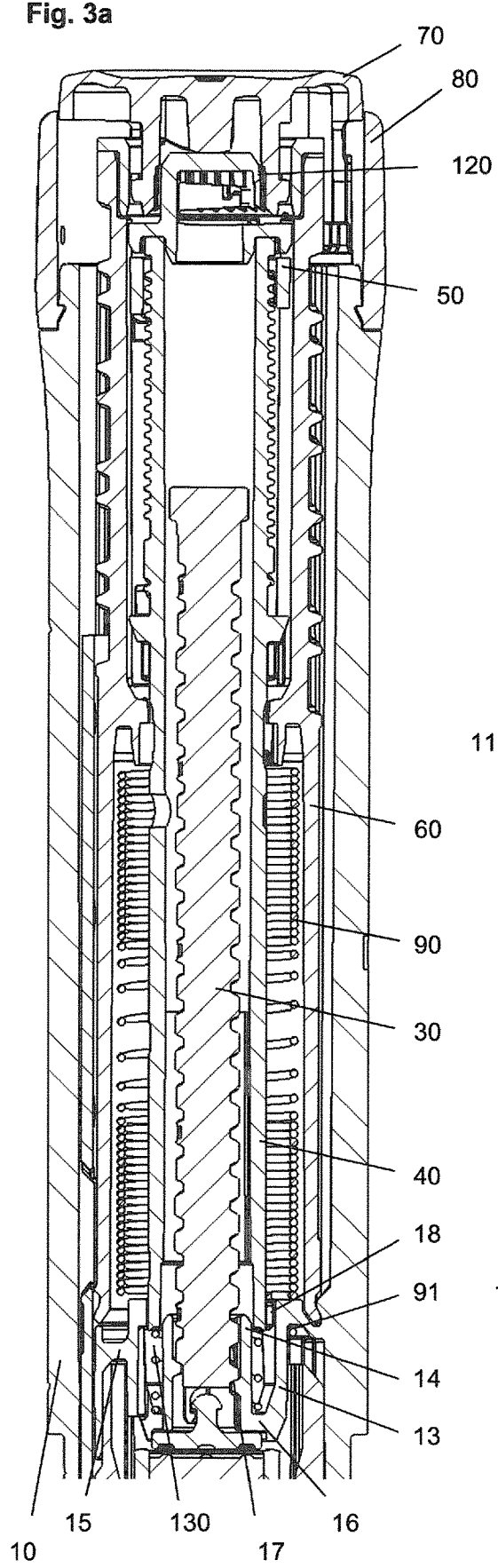
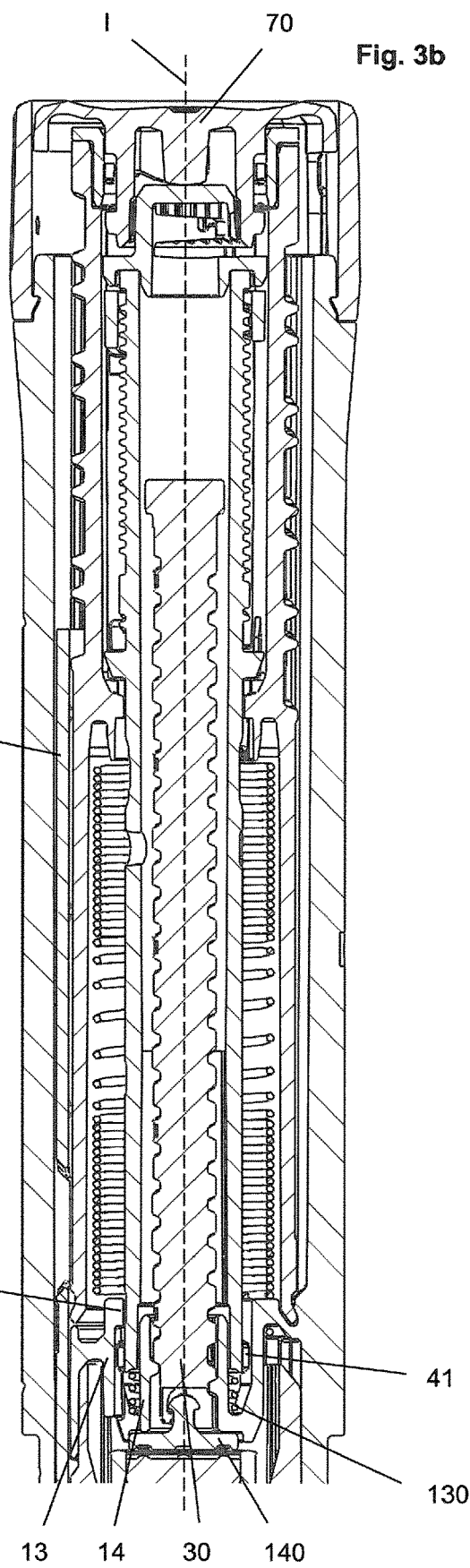

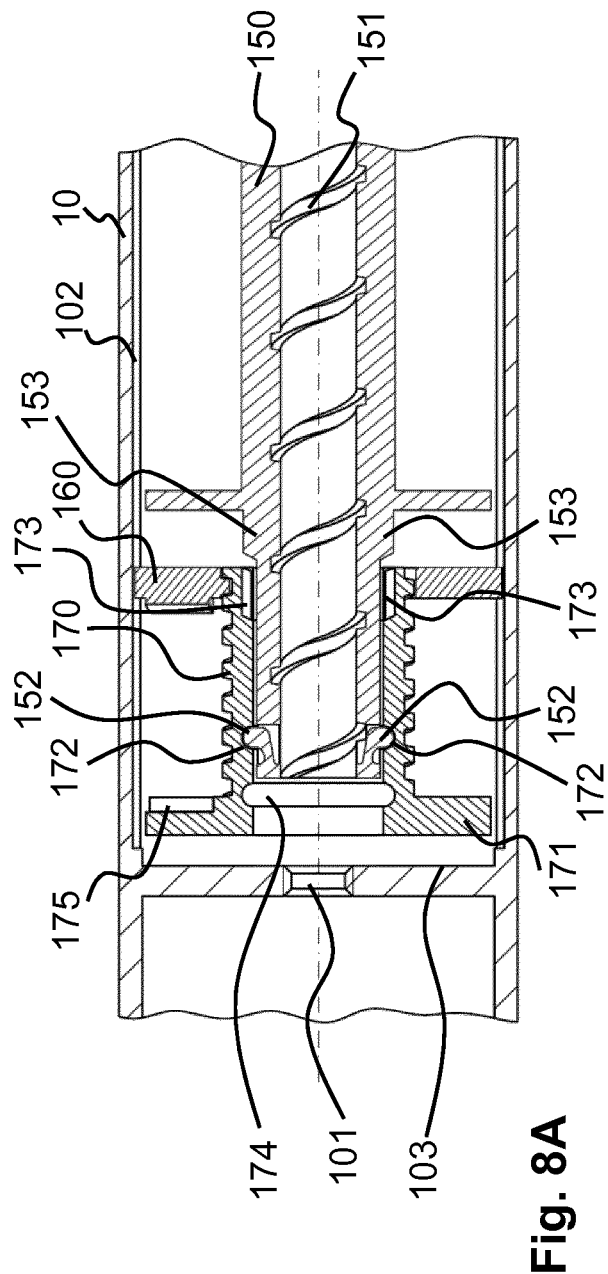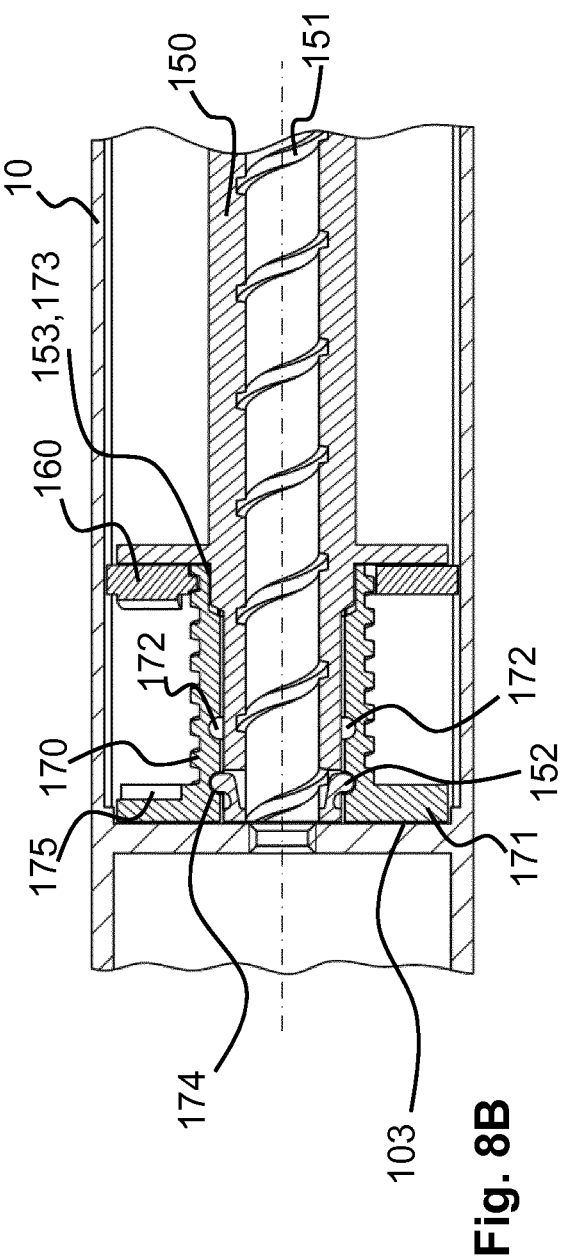

ASSEMBLY FOR A DRUG DELIVERY DEVICE, DRUG DELIVERY DEVICE AND METHOD FOR PRODUCING A DRUG DELIVERY DEVICE

CROSS-REFERENCE TO RELATED APPLICATIONS

The present application is the national stage entry of International Patent Application No. PCT/EP2019/083217, filed on Dec. 2, 2019, and claims priority to Application No. EP 18306607.5, filed on Dec. 4, 2018, the disclosures of which are incorporated herein by reference.

TECHNICAL FIELD

The present disclosure relates to an assembly for a drug delivery device, a drug delivery device comprising the assembly as well as a set with a plurality of drug delivery devices. This disclosure furthermore relates to a method of manufacturing or producing a drug delivery device. The drug delivery device may be a variable dose device, where the size of the dose of drug which is to be dispensed by the device can be set and/or varied by a user. The device may be an injection device, e.g. a needle-based injector and/or a pen-type device, such as a pen-type injector.

BACKGROUND

In drug delivery devices, especially in the case of drug delivery devices which are operated by medically untrained patients, it is of utmost importance that the size of the dose delivered by the drug delivery device does correspond to the size which was set by the user as consistently as possible while the device is in use to dispense drug from a reservoir or cartridge. Drug delivery devices often use piston rods which are moved by a drive mechanism of the device and are arranged to drive a bung within a cartridge body of a cartridge retaining a drug distally relative to the cartridge body in order to dispense the drug from the cartridge.

SUMMARY

During manufacturing of drug delivery devices the distances between a distal end of the piston rod and a proximal end of the bung which face one another may vary widely after the initial assembly of the device. From a manufacturing perspective it may be possible to position the piston rod relative to a housing of the drive mechanism of the drug delivery device pretty accurately. However, it is usually difficult to ensure that the position of the bung relative to the cartridge body is as precisely set for cartridges having the nominally same liquid filling levels, e.g. due to the deformable materials usually used for the bungs. Thus, the initial positions of the bung relative to the cartridge body may vary. Variations in the cartridge body dimensions may have a similar effect, although the influence of the bung may be more pronounced. The mentioned variations increase the variations in the distances between the distal end of the piston rod and the proximal end of the bung in different devices after the devices have been assembled. Therefore, an initial target distance between the piston rod and the bung, which should be achieved during the assembling process of the device, has to be chosen to be great enough to take account of a wide range of possible bung positions relative to the cartridge body in order to avoid that during assembling of the device the piston rod already exerts pressure on the bung which is undesirable, e.g. as it puts mechanical pre-load on the bung. Thus, the fluctuations in the bung position often require that a comparatively large initial target distance is chosen.

A defined initial position between the bung and the piston rod for a variety of devices may be achieved by measures which allow a connection between the drive mechanism and the cartridge or the cartridge unit which is variable, i.e. it does not rely on fixing elements which have defined positions on the respective unit, cartridge unit and drive mechanism unit. Connection methods which allow a variable connection are an adhesive connection or a welded connection, for example. However, if a more reliable connection should be used such as one which established by means of rigid fixing features or securing features, e.g. for a form-fit connection, the relative position after assembling of the device between the bung and the piston rod still varies on account of the variations in the cartridge unit, sometimes considerably.

In order to achieve a defined position between the piston rod and the bung before the first dose is administered to a patient sometimes so-called priming steps are used, where the user has to perform a dose setting and delivery step before the first (self-)administration of the drug takes place. Such a procedure is often termed "air shot". This procedure, however, is still not satisfactory, as it is not sure whether the user—although instructed to do so—indeed performs that step.

Moreover, if the content of the drug or the concentration of drug within the cartridge is increased, it may even occur that the initial distance between the piston rod and the bung is so great that it is greater than a regular dose—e.g. greater than the minimum settable dose or a greater dose—which is dispensed by the drug delivery device or even the maximum settable dose which can be dispensed in one dispensing operation by the drug delivery device. Thus, the first dose which is set to be dispensed may be completely absorbed by the initial gap between the piston rod and the bung which has to be closed, before drug can be dispensed via the bung being displaced relative to the cartridge body. This, of course, is very problematic. Moreover, the second dose may still not be dispensed accurately, even if a priming dose has been dispensed as there may still be a substantial gap after the first dose has been dispensed.

In theory, the position of the piston rod may be adjusted during assembling of the drug delivery device such that it has a defined initial position relative to the bung. However, the associated measures are very complicated and, of course, increase the overall costs of the device.

Another option to achieve a defined initial position is to activate the drive mechanism by setting a dose and dispensing the set dose after the device has been assembled until the piston rod has reached the desired position, expediently before the device is even provided to the user. However, drug delivery devices, especially the ones configured to dispense a variable, e.g. user-settable, dose, often comprise a mechanism which tracks the (end of) content of the cartridge or the maximum amount which can be dispensed from the cartridge. This mechanism is dimensioned such that it is ensured that there is still some drug left in the cartridge when the last dose has been dispensed, i.e. the cartridge is overfilled. This, of course, takes care of avoiding the risk of underdosing. The tracking mechanism for tracking the (end of) content of the cartridge usually has a tracking member which is moved relative to a guide track towards an end position when the dose is set but is not moved relative to the guide track when the set dose is delivered. When the tracking member reaches the end position, the cartridge is considered empty. In the end position, (further) increasing the set dose may be prevented by the tracking member.

Usually, drug delivery devices dispense doses in amounts which are whole-number multiples of a unit increment. As the tracking member also moves during the first setting and dispensing of the dose which may be performed to eliminate the initial gap between the piston rod and the bung as described previously, this results in that the cartridge has to be overfilled with drug at least to an amount which corresponds to the maximum initial distance between the piston rod and the bung when assembling a variety of devices of nominally identical construction. Thus, this overfilled drug is lost, as it is usually not dispensed. The amount of drug which has to be overfilled may be even greater than the maximum dose which can be set with the device as has been explained above.

Even though some issues related with the following disclosure are discussed above it is not conceded that any of the features disclosed above is indeed prior art. Rather, the above should be considered as an explanation of the context of the present disclosure and may illustrate one or more problems which the present disclosure resolves.

Certain aspects provide improvements relating to a drug delivery device. Moreover, the present disclosure may contain additional solutions to additional problems which need not coincide with the claimed subject-matter but rather could be claimed independently.

One aspect of the present disclosure relates to an assembly for a drug delivery device. Another aspect of the present disclosure relates to a drug delivery device, which preferably comprises the assembly. Still another aspect of the disclosure relates to a set of drug delivery devices. Yet another aspect of the present disclosure relates to a method of producing or manufacturing a drug delivery device. Features which are disclosed in relation to one of the aspects do also apply for the other aspects. For example, features disclosed for the assembly do also apply for the drug delivery device and the method, and vice versa. Likewise, the drug delivery device manufactured in the method may be the drug delivery device comprising the assembly. Also, features discussed in different embodiments below may be combined with one another, particularly as long as they do not mutually exclude one another.

In an embodiment, the assembly comprises a housing. The housing may have a distal end and a proximal end. The proximal end and the distal end may be opposite ends of the housing. The distal end may be that end of the housing which is or is to be arranged closest to a dispensing end of the drug delivery device and the proximal end may be that end of the housing which is or is to be arranged furthest away from the dispensing end. "Distal" is used herein to specify directions, ends or surfaces which are directed or face towards the dispensing end of the drug delivery device. On the other hand, "proximal" is used to specify the end to specify directions, ends or surfaces which are directed or face away from the dispensing end of the drug delivery device.

In an embodiment, the assembly comprises a dose setting and drive mechanism. The dose setting and drive mechanism is expediently configured to set a dose in a dose setting operation and/or to dispense the set dose in a dose dispensing or delivery operation of the mechanism. The dose setting and drive mechanism may have a dose setting mode of operation and a dose dispensing mode of operation.

The dose setting and drive mechanism may comprise a dose setting member. The dose setting member may be movable, e.g. rotatable, relative to the housing for a dose setting operation. During the dose setting operation, the dose setting member may be axially secured relative to the housing or may be axially displaced relative to the housing, e.g. away from the distal end and/or away from the proximal end, where the distance of the axial displacement may be proportional to the size of the set dose. The dose setting member may be movable from an initial position to a dose set position relative to the housing in order to set a dose of drug to be delivered in the dose delivery operation of the mechanism, e.g. a dose of a specific size, where the size can be chosen by the user, expediently within certain limits, e.g. between a minimum settable dose and a maximum settable dose. The maximum settable dose may be only a part of the entire content of the cartridge or another reservoir, e.g. such that the maximum settable dose could be delivered multiple times from a device with the assembly. In other words, the amount of drug in the device may be sufficient for a plurality of doses. The axial and/or angular travel distance of the dose setting member from the initial position to the dose set position may be characteristic for the size of the set dose. The dose setting member may be only rotatable or rotatable and axially displaceable relative to the housing for setting a dose.

The dose setting and drive mechanism may further comprise a piston rod which is displaceable in a distal direction relative to the housing by a displacement distance in the dose delivery operation, e.g. to deliver the dose which had been set previously. The displacement distance by which the piston rod is displaced relative to the housing may be determined by the set dose, particularly by its size. That is to say different set doses result in different axial displacements or distal displacements of the piston rod relative to the housing. The piston rod may rotate and move axially or move only axially during the delivery operation. The piston rod may have a thread. The piston rod may be threadedly coupled to the housing. Thus, rotation of the piston rod relative to the housing may, on account of the threaded coupling, result in an axial displacement of the piston rod relative to the housing.

The dose setting and drive mechanism may comprise an energy storage member, e.g. a spring, to provide the driving force for the piston rod or be a manually driven mechanism where the user provides the force necessary to drive the piston rod during the delivery operation. When the energy storage member is used, the user may store the energy for the subsequent dose delivery operation in the energy storage member in the dose setting operation. Alternatively, the dose setting and drive mechanism may be user-driven, i.e. the user has to exert the (entire) force required for the dose delivery operation.

In an embodiment, the drug delivery device comprises the assembly and a cartridge unit. The cartridge unit may be connected to the housing, preferably permanently or releasably. The housing may be part of a housing unit which, aside from the housing, comprises the dose setting and drive mechanism. The housing may retain the dose setting and drive mechanism or at least elements thereof therein. The cartridge unit may comprise a cartridge holder and/or a cartridge, where the cartridge may be retained, e.g. permanently or releasably, in the cartridge holder and/or the cartridge holder is configured to receive the cartridge. The cartridge may contain a drug. A bung may be movably retained in a cartridge body of the cartridge. The drug is preferably a liquid drug or drug formulation. The cartridge unit may be permanently connected to the housing or releasably. A permanent connection is particularly advantageous for a disposable drug delivery device whereas a releasable connection is advantageous for a reusable drug delivery device, where the dose setting and drive mechanism may be used for several cartridges or cartridge units.

In an embodiment, the assembly comprises a guide track. The assembly may comprise a guide member which has the guide track. The guide member may be movable relative to the housing. The guide member may be part of the dose setting and drive mechanism. Alternatively, the guide track may be provided on the housing or on a component axially and/or rotationally secured to the housing. The guide track may be a helical track or thread or may comprise at least a section with a helical thread or track. The helical thread or track may have multiple windings. The thread may be self-locking. In a self-locking thread, an element engaging the thread cannot be moved relative to the thread when it is subject to only an axial load.

In an embodiment, the assembly comprises a tracking member. The tracking member may be configured and/or arranged to cooperate with the guide track. The tracking member may be a nut. The tracking member may be configured to be engaged, e.g. threadedly engaged, with the guide track. Relative rotation between the guide track and the tracking member, e.g. when threadedly engaged, may result in a relative movement between tracking member and guide track. The tracking member may be displaced towards an end position along the guide track, preferably starting at an initial position. The distance of the tracking member from the end position along the guide track may be indicative for the amount of drug which is considered to be still available in the cartridge, i.e. that part of the content of the cartridge which is available for being dispensed. In the initial position the entire drug may still be in the cartridge. In the end position, the cartridge may be considered empty. The tracking member may be used to block or to prevent an increase of the dose via the dose setting member when the tracking member is in the end position. In the end position, the tracking member may abut an end stop which prevents further relative movement of the tracking member and the guide track in the direction which would increase the set dose.

In an embodiment, the assembly comprises a coupling mechanism. The coupling mechanism may be configured to operatively couple the tracking member to the dose setting and drive mechanism, preferably such that movement of the dose setting member relative to the housing during the dose setting operation is converted into relative movement between the tracking member and the guide track, e.g. movement of the tracking member along the guide track or movement of the guide track along the tracking member. The displacement of the tracking member along or relative to the guide track in the dose setting operation may be indicative for the size of the currently set dose. The relative movement between guide track and tracking member may be driven by the movement of the dose setting member in the dose setting operation. For example, rotation in one direction (the one where the dose is increased) may result in a reduction of the distance between tracking member and end position. The dose setting member may drive the tracking member or the guide member with the guide track as the case may be. During the dose setting operation when the dose is increased, the distance between the end position and the tracking member along the guide track may be reduced. When the set dose is decreased or corrected, the distance may be increased again. For example, rotation in the direction opposite to the one direction (i.e. the direction where the dose is decreased or corrected) may result in an increase of the distance between tracking member and end position. However, when a dose delivery operation has been triggered, initiated, and/or completed, the position of the tracking member relative to the end position along the guide track may, preferably, be no longer increased. The dose delivery operation preferably does not affect the relative position between tracking member and guide track. During the next dose setting operation, i.e. subsequent to the dose delivery operation, the tracking member may be displaced further towards the end position.

In an embodiment, the coupling mechanism has two different states, a coupled state and a non-coupled state. The coupling mechanism may be switchable from the non-coupled state to the coupled state. The coupling mechanism may be established using at least one first coupling feature and at least one second coupling feature which do not engage one another in the non-coupled state but engage one another in the coupled state. The switching may involve a relative displacement, e.g. an axial displacement, between the first and second coupling features to engage the features with one another. The coupling interface may be a rotationally and/or axially locked interface between two components of the assembly.

In the coupled state, the tracking member may be operatively coupled to the dose setting member via a coupling interface. Thus, in the coupled state, the coupling interface is expediently established. When the coupling mechanism is in the coupled state, in a dose setting operation, the distance between the tracking member and an end position of the tracking member relative to the guide track, in particular along the guide track, may be reduced by an amount which is determined by the dose which is set in the dose setting operation. Movement of the dose setting member relative to the housing in the dose setting operation may be converted into movement of the tracking member relative to the guide track, in the coupled state. When the tracking member has reached the end position along the guide track e.g. when abutting an end stop, (further) increasing the set dose may be prevented. In the non-coupled state, the coupling interface may be not established or released. Thus, in the non-coupled state, the dose setting and drive mechanism and the tracking member may be decoupled or uncoupled. In particular a movement of the dose setting member may not result in a relative movement between tracking member and guide track. The remaining functionalities of the dose setting and drive mechanism may, however, be given. A dose setting operation and a subsequent delivery operation may be performed resulting in the piston rod being axially displaced relative to the housing by a distance determined by the set dose. Thus, while the coupling mechanism is in the non-coupled state, it may be ensured that the tracking member does not move towards the end position when the dose setting member is moved for setting a dose.

This selective coupling between dose setting and drive mechanism and tracking member or guide track may be used, e.g. during manufacturing of a drug delivery device, to adjust the initial distance between piston rod and bung in the cartridge without requiring overfilling of the cartridge as has been described in the introductory section. As long as the mechanism is in the non-coupled state dose delivery operations can be conducted as needed to adjust the position of the piston rod relative to the housing and/or the bung. Thus, even if the housing and the cartridge unit have dedicated fixing features at defined and/or fixed, i.e. non-variable, locations, a defined position between piston rod and bung can be achieved without requiring overfilling.

In an embodiment, the coupling mechanism is configured to be switchable from the non-coupled state into the coupled state. The assembly may be configured such that, in order to enable switching or such that it is switched from the non-coupled state to the coupled state, at least one dose delivery operation has to be initiated or triggered, e.g. by operating an activation member of the dose setting and drive mechanism. The switching may occur at the start, close to or at the end of the dose delivery operation. Preferably, only one or exactly one dose delivery operation has to be initiated, triggered and/or completed to switch the coupling mechanism from the non-coupled state to the coupled state.

As discussed above, before the coupling mechanism may be switched to the coupled state, at least one dose setting operation may have to be performed with a subsequent dose delivery operation being at least initialized or triggered. The piston rod may be moved according to the set dose during the dose delivery operation. The size of the set dose is expediently chosen so as to achieve the desired position of the piston rod relative to the housing for a defined initial gap between the piston rod and the bung. In this way, a defined initial position between the piston rod and the bung is reached. This adjustment may be still done in the factory of the assembling company or the manufacturer and does not have to be done by the (end) user. Thus, in the device as provided to the user or the pharmacy, the mechanism may already be in its coupled state.

In an embodiment, when the mechanism is in the coupled state but has not yet been operated once to perform a dose delivery operation, e.g. when the cartridge still contains all of its content or drug, the tracking member may be in its initial position relative to the guide track. In the non-coupled state, the tracking member may be either in the initial position along the guide track or in a different or original position. The different position may be further away from the end position than the initial position. When the mechanism is switched to the coupled state, the tracking member may be moved from the original position to the initial position relative to the guide track, preferably thereby establishing the coupling interface. For example, as has been discussed above already, the switching to the coupled state may be achieved during or near the end of the dose delivery operation after the dose setting operation in the non-coupled state has been performed.

Expediently, the coupling mechanism is configured such that it is switched from the non-coupled state to the coupled state during the first dose delivery operation which is performed using the dose setting and drive mechanism. This ensures that after the first dose setting and delivery operation the drug delivery device comprising the assembly is in a defined state and guaranteed to operate reliably. The coupling mechanism may be switched from the non-coupled state into the coupled state expediently by a regular dose setting and dispensing operation. Accordingly, no extra operating elements have to be provided for this purpose.

In an embodiment, in the non-coupled state, the tracking member may be rotationally locked relative to the guide track and/or the guide member. Thus, there may be no relative rotation between the guide track and the tracking member. Either both do not rotate, for example, or they co-rotate. For switching into the coupled state, the rotational lock may be released, e.g. by an axial shift of the tracking member relative to the guide track. In the coupled state, rotation of the dose setting member causes relative rotation between the guide track and the tracking member.

In an embodiment, in the non-coupled state, the tracking member may be decoupled from the guide track. In the coupled state, the coupling may be established, e.g. by moving the tracking axially relative to the guide track. For this purpose, an axial movement of an actuation member may be used as is discussed in more detail below. In the non-coupled state, the guide track may be freely rotatable relative to the tracking member or be rotationally locked relative to the tracking member.

In an embodiment, in the non-coupled state, the guide member and/or the tracking member is decoupled from the dose setting member, e.g. rotationally and/or axially. Thus, the dose setting member may be moved, e.g. rotated, relative to the tracking member and/or the guide member without influencing the relative position of the tracking member along the guide track. In the coupled state, dose setting member and guide member or the dose setting member and the tracking member may be rotationally locked, preferably at least when the dose setting operation is performed.

In an embodiment, when the tracking member is moved when the coupling mechanism is switched from the non-coupled state to the coupled state, in particular relative to the guide track, or the guide track is moved relative to the tracking member, the distance of the relative movement may be independent of the size of the set dose.

In an embodiment, the coupling mechanism, after having switched into the coupled state is constrained to the coupled state. Consequently, the switching to the coupling may be irreversible. Thus, a user cannot switch the coupling mechanism back to the non-coupled state, which would be undesirable, as then the tracking member would be uncoupled from the dose setting and drive mechanism and the content of the cartridge could no longer be reliably tracked by way of the tracking member.

In an embodiment, the coupling mechanism is configured to switch from the non-coupled state to the coupled state during the first delivery operation. Expediently, the switching is performed at the start of the first delivery operation or at the end of the first delivery operation. Switching at the start may be driven by the actuation member. Switching at the end of the dose delivery operation may be achieved by one element of the dose setting and drive mechanism being stopped and another element moving relative to the stopped element, where during this relative movement, the coupling interface is established.

In an embodiment, in the drug delivery device, the coupling mechanism is in the coupled state, preferably already when the device is unpacked or used for the first time by the user to set and/or deliver a dose. Thus, in the ready to use condition when the device is used for the first time by the user, no priming operation has to be performed. Also, it is advantageous that the rest of drug in the cartridge when the cartridge is considered empty may be very small, since the cartridge does not have to be overfilled as significantly as has been explained above already.

In an embodiment, the assembly comprises a dose indication member, e.g. a number sleeve. The dose indication member may be coupled to the dose setting member during the dose setting operation, e.g. to indicate the size of the set dose. When the coupling mechanism has been switched to the coupled state—preferably at the end of that dose delivery procedure which is initiated to switch into the coupled state, the dose indication member may indicate a defined value. This value, e.g. zero, may be displayed at the start of each subsequent dose setting operation.

In an embodiment, the dose setting member is moved towards its initial position—expediently from the dose set position—during a dose delivery operation. The coupling mechanism may be designed to switch from the non-coupled state to the coupled state when the dose setting member reaches its initial position relative to the housing. In this way, it can be ensured that the coupling mechanism does not switch to the coupled state before the entire first delivery operation has been performed. Then, the piston rod preferably has reached its designated end position relative to the bung. Alternatively, the dose delivery operation will not affect the relative angular position between dose setting member and housing.

In an embodiment, the dose setting member is movable, preferably rotatable, relative to the housing. The dose setting member may be movable, e.g. rotatable, relative to the housing in an incremented fashion, e.g. by a distance and/or an angle corresponding to one or more unit dosage increments, for the dose setting operation. Thus, each settable dose may be a whole-number multiple of the unit dosage increment. The unit dosage increment may be one international unit (1 IU; IU: International Unit) or a plurality of international units, such as 5 IU, of the drug to be delivered, for example. The unit dosage increment may define or may correspond to the minimum settable dose. The rotation angle required to set a dose of a particular size is defined by the number of unit increments of that dose. The angle per unit increment may be the same and/or constant regardless of the number of increments in the dose. There are various ways to realize the incremented rotatability such as ratchet mechanisms which define stable positions of the dose setting member relative to the housing where two adjacent stable positions may be separated by the angle corresponding to one unit dosage increment.

In an embodiment, the coupling mechanism is configured such that the switching from the non-coupled state into the coupled state is possible in different relative angular coupling positions between the dose setting member and the housing, between the dose setting member and the guide member and/or between the dose setting member and the tracking member. The assembly may be configured such that each coupling position is a relative angular position which the dose setting member and housing may or can have when a dose has been set.

In an embodiment, for a variety of sizes of the dose which is set in the dose setting operation, the coupling mechanism may be switched from the non-coupled state into the coupled state. The switching may be possible for every settable dose or only for a subset of settable doses (also termed "switchable doses" in the following). That is to say not every settable dose may result in an angular coupling position. In the former case, the initial position between piston rod and bung may be set very accurately as the piston rod may be displaced by every possible displacement distance before the coupling mechanism is switched to the coupled state—this may require higher efforts when designing the mechanism. In the latter case, the efforts may be reduced. The number of switchable doses or angular coupling positions may be greater than or equal to one of the following values: 3, 4, 5, 6, 7, 8, 9, 10, even when the number is smaller than the total number of different settable doses. The number of switchable doses may be less than or equal to one of the following values: 0.5 TD, 0.4 TD, 0.3 TD, 0.25 TD, where TD is the total number of settable doses, i.e. the number of doses settable between the minimum settable dose and the maximum settable dose.

In an embodiment, two adjacent angular coupling positions, preferably any two arbitrary adjacent angular coupling positions, may be separated by an angle which is defined by the unit dosage increment. For example, the angle may correspond to the angle separating two unit dosage increments and/or be a whole-number multiple of this angle. The angle separating two unit dosage increments may be the angle which is required for the dose setting member to be rotated to increase the size of the set dose by one unit dosage increment. To put it differently, the angle separating two adjacent angular coupling positions may be a whole-number multiple of the angle corresponding to one unit dosage increment, where the whole-number may be greater than one, or may be equal to the angle corresponding to one unit dosage increment. The angular coupling positions may be evenly or uniformly distributed in the angular direction. If the separation between two adjacent coupling positions corresponds to the unit dosage increment, the adjustment of the initial gap is particularly fine. However, if is greater the options for adjusting the initial gap may be more restricted but still sufficient.

In an embodiment, the assembly comprises an actuation member, e.g. a button. The actuation member may have to be manipulated, e.g. pressed, in order to initiate or trigger a dose delivery operation. The user may have to manipulate or press the actuation during the entire dose delivery operation or only for initiating or triggering the dose delivery operation. The former is particularly suitable for assemblies, where the driving force for the piston rod is provided, preferably entirely, by the user. The latter is particularly suitable for dose setting and drive mechanisms which utilize an energy storage member to provide the driving force to drive the piston rod. However, even for mechanisms with such an energy storage member, it may be possible that the actuation member may have to be pressed during the entire delivery operation. If the actuation member is released, the delivery operation may be interrupted. The actuation member may be movable from a first position, where the assembly is in a dose setting mode of operation, into a second position, where the assembly is in a dose delivery mode of operation. The movement of the actuation member may be relative to the housing, relative to the dose setting member, relative to the guide member, relative to the guide track, and/or relative to the tracking member. The assembly may be configured such that the movement of the actuation member from the first position to the second position is used to switch the coupling mechanism from the non-coupled state to the coupled state. The actuation member may be biased into the first position, e.g. by a biasing member, such as a spring. Thus, the dose setting mode of operation may be the regular mode of operation. The first position and the second position may be axially offset from one another. The second position may be distally offset from the first position.

In an embodiment, the second position is axially offset from the first position in a direction towards the end position of the tracking member along the guide track. Thus, when moving from the actuation member first position to the second position, the tracking member may be moved along the guide track, preferably only during the first actuation of the actuation member, i.e. only when the first dose delivery operation is initiated.

In an embodiment, the assembly is configured such that the movement of the actuation member from the first position to the second position drives a relative movement between the tracking member and the guide track, e.g. to move the tracking member from the original position into the initial position along the guide track, expediently to switch the coupling mechanism into the coupled state. The movement of the actuation member from the first position to the second position is transferable or transferred to the tracking member in the non-coupled state, preferably in order to switch the coupling mechanism from the non-coupled state to the coupled state. For example, the movement of the actuation member may be transferred to the tracking member such that the tracking member is moved relative to the guide track into the initial position, e.g. from the original position. In the initial position the tracking member may be engaged with a thread of the guide track. In the original position, the tracking member may be disengaged from the thread of the guide track. The movement of the actuation member may be transferred to the tracking member by an abutment between the tracking member and the actuation member in the non-coupled state. When the tracking member has been moved once by the actuation member, subsequent movements of the actuation member from the first position to the second position expediently do not affect the tracking member.

In an embodiment, the assembly comprises at least one locking feature. The locking feature may be arranged and configured to prevent a movement of the tracking member back towards the original or first position when the coupling mechanism is in the coupled stated, expediently already immediately after the switching has been performed. The locking feature may be arranged to interact with the tracking member, e.g. to prevent movement of the tracking member away from the end position along the guide track. In this way, it may be prevented that the coupling mechanism can be switched back from the non-coupled state to the coupled state.

In an embodiment, in the non-coupled state, the following components are rotationally locked to one another: tracking member, dose setting member, a guide member with the guide track. In the coupled state, one of the tracking member and the guide member, e.g. the tracking member or the guide member, may be rotatable relative to the other one of the tracking member and the guide member when the dose setting member is rotated for setting a dose in the dose setting operation.

In an embodiment, the guide track comprises a, preferably helical, thread. The tracking member may be engaged with the thread in the coupled state. In the non-coupled state, the tracking member may be disengaged from the thread or engaged with the thread. In case the tracking member is engaged with the thread in the non-coupled state, it is expedient to rotationally decouple the dose setting member from the guide member and/or the tracking member in the non-coupled state such that, when the dose setting operation is performed in the non-coupled state, there is no relative rotation between guide track and tracking member. Then, the relative position between guide track and tracking member does not change during dose setting.

In an embodiment, the guide track comprises an axially extending section. The axially extending section of the guide track may lead into the helical thread. In the non-coupled state, the tracking member may be engaged with the axially extending section. The axially extending section may cooperate with the tracking member such that, when the tracking member engages the axially extending section, the tracking member is rotationally locked relative to the guide track or the guide member. The axis along which the axially extending section extends may be the main axis of the housing or the axis defining the helix of the helical thread. The threaded section of the guide track may be distally offset from the axially extending section. The thread may form a helically threaded section of the guide track. Thus, the tracking member may be moved from the axially extending section to the helically threaded section of the guide track via the actuation member when switching from the non-coupled state to the coupled state.

Alternatively to an axially extending section of the guide track, there may be a circumferentially extending section offset from the thread with which the tracking member is engaged in the non-coupled state. Then, during dose setting a relative rotation between the guide track and the tracking member may occur without involving a displacement of the tracking member towards the end position. However, an axially extending section may still be advantageous because, in this case, there is a defined relative position between the tracking member and the guide track also in the non-coupled state for every dose which is set during the dose setting operation.

In an embodiment the assembly is configured such that, in the non-coupled state, the dose setting member is rotatable relative to the tracking member and relative to the guide track. In the coupled state, rotation of the dose setting member may be transferred to the tracking member or to the guide member with the guide track such that relative rotation between the guide track and the tracking member is achieved to displace the tracking member towards the end position. When switching to or into the coupled state, a rotational lock may be established, which is operative between the dose setting member and the tracking member or between the dose setting member and the guide member as the case may be. In this embodiment, the tracking member may be engaged with the thread of the guide track in the coupled state and in the non-coupled state.

In an embodiment, the dose setting member is rotatable relative to the guide member in the non-coupled state.

In an embodiment, the guide member and the dose setting member are rotationally locked in the coupled state. Thus, rotation of the dose setting member may be transferred to the guide member in the coupled state. The relative rotation between the guide member and the tracking member may cause a relative displacement between the tracking member and the guide track such that the tracking member is positioned closer to the end position along the guide track during the dose setting operation. Accordingly, the coupling mechanism may provide a rotational lock between the guide member and the dose setting member in the coupled state. In order to apply the rotational lock, e.g. by engaging according interlock features, the guide member and the dose setting member may be axially displaced relative to each other, e.g. at or near the end or at or near the beginning or initialization of the dose setting operation, when switching from the non-coupled state to or into the coupled state.

In an embodiment, the guide member and the dose setting member are axially locked to one another, preferably in the coupled state and/or in the non-coupled state. In the coupled state, the dose setting member and the guide member may be rotationally and axially locked to each other. In the coupled state, the dose setting member and the guide member may act as a single part. However, in the non-coupled state, relative rotational movement between the guide member and the dose setting member may be allowed.

In an embodiment, the assembly is configured such that it is independent of the size of the set dose whether the coupling mechanism is switched from the non-coupled state to or into the coupled state In an embodiment, the assembly is configured such that the elements of the assembly perform the same movements relative to one another during the dose delivery operation, regardless of whether the coupling mechanism is in its coupled state or in its non-coupled state.

In an embodiment, the dose setting member is engaged with the piston rod to drive the movement of the piston rod during the dose delivery operation. Alternatively, an additional drive member, i.e. in addition to the dose setting member, may be provided which engages the piston rod. The drive member may be the guide member or different from the guide member.

In an embodiment, the guide member and the dose setting member are rotationally locked in the dose delivery mode of operation, particularly even if they are rotatable relative to one another in the dose setting mode of operation in the coupled and/or the non-coupled state.

In an embodiment, a coupling movement, i.e. a relative movement between two members of the assembly which is required to establish the coupling interface, is independent of the size of the set dose. In other words, the coupling movement may be a movement by a fixed distance independent of the size of the set dose.

In an embodiment, the concentration of drug or active pharmaceutical ingredient, e.g. insulin, in the cartridge of the drug delivery device is greater than or equal to one of the following values: 150 IU per ml of liquid in the cartridge, 200 IU per ml of liquid in the cartridge, 250 IU per ml of liquid in the cartridge, 275 IU per ml of liquid in the cartridge, 300 IU per ml of liquid in the cartridge.

In an embodiment, in the drug delivery device, the cartridge may be full, i.e. the device may be in its original state as delivered by the manufacturer.

In an embodiment, in the drug delivery device, the coupling mechanism may be in its coupled state. The switching from the non-coupled state to or into the coupled state may have been used to adjust the position of the distal surface of the piston rod relative to the proximal surface of the bung, e.g. during manufacturing. The coupling mechanism may, however, be constrained to its coupled state, such that switching the mechanism back to the non-coupled state is not possible.

In an embodiment, in the drug delivery device, the initial distance, which is preferably greater than zero, between piston rod and bung, e.g. the distance before the first dose delivery operation is initiated by the user with the coupling mechanism being in its coupled state, such as by a user or patient to administer the drug or to prime the drug delivery device before the first use, is less than or equal to one of the following values:

the displacement distance determined by or corresponding to the smallest dose settable with the dose setting and drive mechanism of the assembly in a dose setting operation, e.g. less than the displacement distance corresponding to one unit dosage increment or the minimum settable dose, and/or the smallest dose settable with the dose setting and drive mechanism of the assembly in a dose setting operation which allows a switching of the coupling mechanism from the non-coupled state to the coupled state, i.e. the distance corresponding to the smallest switchable dose the displacement distance determined by or corresponding to N unit dosage increments, where N is an arbitrary one of the following values: 1, 2, 3, 4, 5, 6, 7, 8, 9, 10, 11, 12, 13, 14, 15, 16, 17, 18, 19, 20.

In an embodiment, alternatively or additionally to the previous embodiment, the initial distance between the piston rod and the bung is greater than or equal to one of the following values:

the displacement distance determined by or corresponding to N unit dosage increments, where N is an arbitrary one of the following values: 1, 2, 3, 4, 5, 6, 7, 8, 9, 10, 11, 12, 13, 14, 15, 16, 17, 18, 19, 20; and/or 0.2 mm, 0.5 mm, 1 mm, 1.5 mm, 3 mm.

Specifically, the initial distance may be between the displacement distance corresponding to a dose of one unit dosage increment and the one corresponding to a dose of 20 unit dosage increments, e.g. between the distances corresponding to a dose of one unit dosage increment and three unit dosage increments.

If the initial distance is chosen to be greater than the distance corresponding to one unit dosage increment, it can be guaranteed that there will be no contact between piston rod and bung tin the initial state of the device, i.e. when the device has not been primed by the user. This avoids that there will be mechanical stress in the device between the cartridge unit and the piston rod of the housing unit, when the device is in the initial state. If the initial distance is less than one of the values recited above, it can be achieved that the amount by which the cartridge has to be overfilled is still tolerable. Preferably, the initial distance is less than the distance corresponding to five unit dosage increments, three unit dosage increments, or two unit dosage increments. The device can then be primed by setting a dose of a certain number of, e.g. two or three, unit dosage increments and dispense the dose. If liquid is expelled from the device, the priming was successful.

In an embodiment, the set of drug delivery devices may comprise a plurality of drug delivery devices, e.g. as described further above. The devices may have the same construction, e.g. part count, couplings between the parts, and/or design of the parts, may be provided to deliver the same drug, may have cartridges with the same filling level or volume and/or may have equivalent dose setting and drive mechanisms which for every particular dose which is set in dose setting operations in the different devices displace the piston rods by the same distances. All of the devices in the set may have an initial distance or gap between piston rod and bung which is less than or equal to and/or greater than or equal to one of the values cited further above. The set may comprise 10 or more drug delivery devices, such as 50 or more, 100 or more or 1000 or more drug delivery devices.

Alternatively or additionally, the variation of the distance of the proximal surface of the bung from the proximal edge or rim of the cartridge body may be greater than the variation in the initial gap, particularly as taken over all devices of the set.

For example, the difference $\Delta_{Gap,max/min}$ between the maximum of the distances of the piston rod from the bung taken over all the devices of the set, i.e. the maximum initial gap of the set, and the minimum of the distances of the piston rod from the bung taken over all the devices of the set, i.e. the minimum initial gap of the set, may be less than or equal to one of the following values: D1, D2, D3, D4, D5, D6, D7, D8, D9, D10, $\Delta_{Bung,max/min}$, $0.9\Delta_{Bung,max/min}$, $0.8\Delta_{Bung,max/min}$, $0.7\Delta_{Bung,max/min}$, $0.6\Delta_{Bung,max/min}$, $0.5\Delta_{Bung,max/min}$, $0.4\Delta_{Bung,max/min}$, $0.3\Delta_{Bung,max/min}$, $0.2\Delta_{Bung,max/min}$, $0.1\Delta_{Bung,max/min}$, $0.05\Delta_{Bung,max/min}$. Here, DX (X=1 to 10) may be the displacement distance by which the piston rod is displaced distally during a delivery operation relative to the position it had before the dose setting operation has been performed to dispense a dose of X unit dosage increments during the dose delivery operation. DX may be the displacement distance corresponding to a dose of X unit dosage increments. $\Delta_{Bung,max/min}$ may be the difference between the maximum of the distances of the bung from the proximal end of the cartridge body taken over all the devices of the set, i.e. the bung, of which the proximal end is furthest away from the proximal end of the cartridge body of all cartridges in the set, and the minimum of the distances of the bung from the proximal end of the cartridge body taken over all the devices of the set, i.e. the bung of which the proximal end is positioned closest to, but preferably still distally offset from, the proximal end of the cartridge body of all cartridges in the set. All devices of the set may have an initial gap or initial distance greater than or equal to D1.

In an embodiment, the method comprises the following steps:

a) providing a cartridge unit, the cartridge unit comprising a cartridge containing a drug and a bung which is movably retained in a cartridge body of the cartridge;

b) providing a housing unit, which comprises
a housing having a distal end and a proximal end,
a dose setting and drive mechanism comprising a dose setting member which is moveable relative to the housing for a dose setting operation from an initial position to a dose set position in order to set a dose of drug, the dose setting and drive mechanism further comprising a piston rod which, after the dose setting operation, is displaceable in the distal direction relative to the housing in a dose delivery operation of the dose setting and drive mechanism, wherein, during the delivery operation, the piston rod is displaced relative to the housing by a displacement distance which is determined by the set dose,
a guide track,
a tracking member which is configured to cooperate with the guide track, the tracking member having an end position relative to the guide track where the distance from the end position is indicative for the amount of drug remaining in the cartridge, c) determining a bung position of the bung relative to the cartridge body. The determined position may vary due to the manufacturing tolerances. For example, a distance of a proximal face of the bung from the proximal rim of the cartridge body may be determined d) determining, based on the determined bung position, a desired piston rod position of the piston rod relative to the housing where the desired piston rod position is determined such that, if the housing unit and the cartridge unit are connected, the piston rod and the bung are arranged at a predetermined distance relative to one another, and determining a particular displacement distance by which the piston rod has to be displaced relative to the housing in the distal direction to be in the desired piston rod position;

e) moving the dose setting member relative to the housing to a dose set position to set a dose which is required to displace the piston rod relative to the housing by the particular displacement distance, f) performing the dose delivery operation to displace the piston rod by the particular displacement distance to move the piston rod into the desired piston rod position relative to the housing, g) during or after step f), operatively connecting the tracking member to the dose setting and drive mechanism such that when the next dose setting and/or delivery operation has been performed using the dose setting and drive mechanism the tracking member is arranged closer to an end position along the guide track, and h) before or after step g) and/or before or after step f) connecting the cartridge unit and the housing unit to one another for the drug delivery device.

As the tracking member is not connected operatively to the dose setting and drive mechanism when the dose for the particular displacement distance is set, the dose setting and drive mechanism may be operated to adjust the initial gap without any influence on the position of the end of content tracker. Thus, the cartridges do not need to be overfilled considerably as has been explained above already.

In a particularly advantageous embodiment, an assembly for a drug delivery device comprises:

a housing having a proximal end and a distal end,
a dose setting and drive mechanism comprising a dose setting member which is moveable relative to the housing in a dose setting operation from an initial position to a dose set position in order to set a dose of drug, the dose setting and drive mechanism further comprising a piston rod which, after the dose setting operation, is displaceable in the distal direction relative to the housing in a dose delivery operation of the dose setting and drive mechanism, wherein, during the dose delivery operation, the piston rod is displaced relative to the housing by a displacement distance which is determined by the set dose, e.g. by the size of the set dose,
a guide track,
a tracking member which is configured to cooperate with the guide track,
a coupling mechanism which is configured to operatively couple the tracking member to the dose setting and drive mechanism, wherein
the coupling mechanism has two different states, a coupled state and a non-coupled state, wherein, in the coupled state, a coupling interface is established, wherein the tracking member is operatively coupled to the dose setting and drive mechanism via the coupling interface such that in the dose setting operation the distance between the tracking member and an end position of the tracking member along the guide track is reduced by an amount which is determined by the dose which is set in the dose setting operation, and
wherein, in the non-coupled state, the coupling interface is not established, wherein the coupling mechanism is configured to be switchable from the non-coupled state into the coupled state, and wherein the assembly is configured such that in order to enable switching from the non-coupled state to the coupled state at least one dose delivery operation of the dose setting and drive mechanism, preferably exactly one, has to be initiated and/or completed.

The advantages of this embodiment will become apparent from the description further above and from the following description.

Further advantages, expediencies and advantageous embodiments of the present disclosure are discussed further below in conjunction with the drawings and the exemplary embodiments shown therein.

BRIEF DESCRIPTION OF THE FIGURES

FIG. 3a shows a sectional view of the proximal end of the device of FIG. 1 in a dose setting state.

FIG. 3b shows a sectional view of the proximal end of the device of FIG. 1 in a dose dispensing state.

FIG. 5b shows a detail of the embodiment of FIG. 5a.

FIGS. 8A and 8B illustrate another embodiment of a coupling mechanism.

Figure 1:
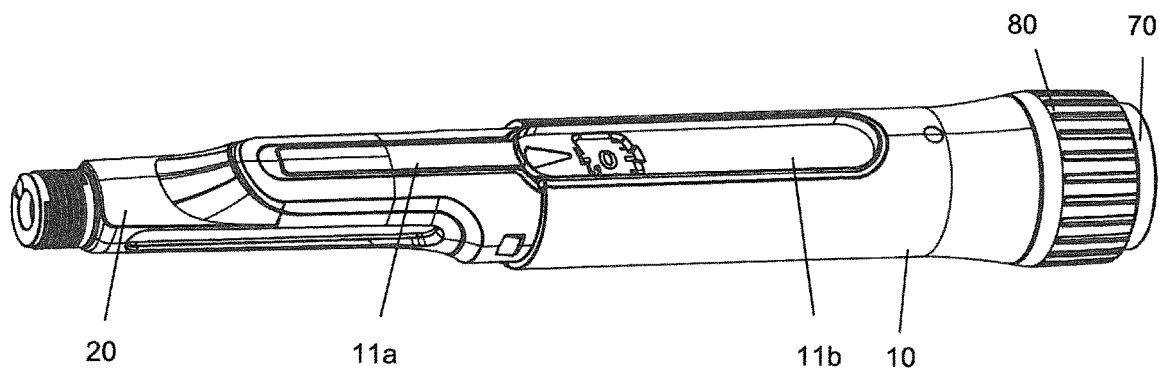
FIG. 1 shows a perspective view of an embodiment of a drug delivery device.

Identical elements, identically element acting elements and elements of the same kind may be provided with the same reference numerals in the drawings. Moreover, it should be appreciated that the drawings just illustrate some embodiments of the present disclosure. The disclosed concepts may be applicable to drug delivery devices of designs different from the ones disclosed below as well.

DETAILED DESCRIPTION

Figure 2:
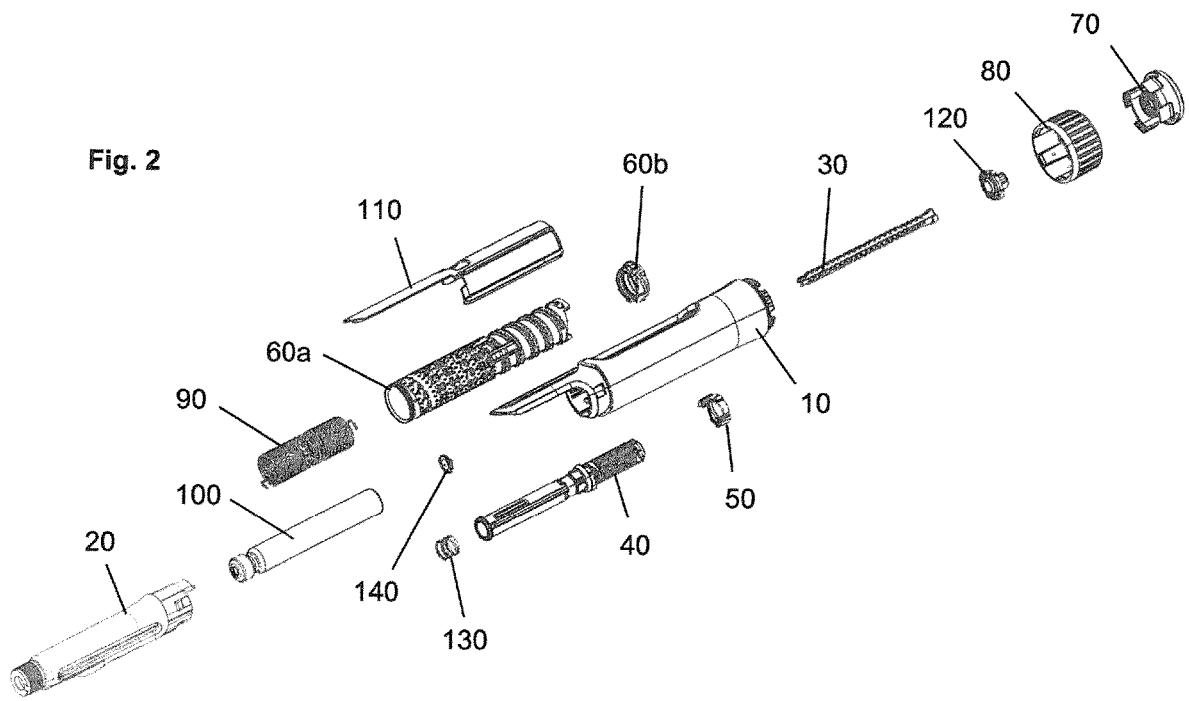
FIG. 2 shows an exploded view of the components of the device of FIG. 1.

FIG. 1 shows a drug delivery device in the form of an injection pen. The device has a distal end (left end in FIG. 1) and a proximal end (right end in FIG. 1). The component parts of the drug delivery device are shown in FIG. 2. The drug delivery device comprises a body or housing 10, a cartridge holder 20, a lead screw (piston rod) 30, a drive sleeve 40, a nut 50, a dose indicator (number sleeve, dose setting member) 60, a button 70, a dial grip or dose selector 80, a torsion spring 90, a cartridge 100, a gauge element 110, a clutch plate 120, a clutch spring 130 and a bearing 140. A needle arrangement (not shown) with a needle hub and a needle cover may be provided as additional components, which can be exchanged. All components are located concentrically about a common principal axis I (FIG. 3b) of the mechanism.

The housing 10 or body is a generally tubular casing element having a proximal end with an enlarged diameter. The housing 10 provides location for the liquid medication or drug cartridge 100 and cartridge holder 20. As shown in FIGS. 1 and 2, the housing comprises a first window 11a and a second window (or lens) 11b which are incorporated into the housing body e.g. by twin-shot molding. The windows 11a, 11b may be molded during a first shot in a translucent (and preferably transparent) material, and the outer cover of the housing is molded during a second shot in an opaque material.

In the embodiment of FIGS. 1 to 3b the housing comprises an insert 12 as an integral part located as an inner wall near the distal end of the housing. The insert 12 may be moulded in the translucent material. As an alternative, the insert or parts thereof may be formed in the opaque material or as a separate component part as depicted in the embodiment of FIG. 4.

The insert 12 is a cup-shaped component part with a sidewall 13 and a tube 14 extending through the insert 12, thus forming an annular space there between. Arms 15 extend radially outwards from the sidewall 13. A bottom wall 16 connects the sidewall 13 and the tube 14 on the distal side of the insert 12, whereas the opposite proximal side is open. The insert 12 has various interfaces. For example, the tube 14 of insert 12 comprises an inner thread 17 engaging the piston rod 30. In addition the radial space between the tube 14 and the outer sidewall 13 may provide a bearing area receiving the drive spring 90 and the clutch spring 130. Further, spline teeth 18 are provided on the insert 12 engaging corresponding spline teeth 41 at the distal end of drive sleeve 40. Teeth 18 interact with drive sleeve 40 to rotationally couple and de-couple the drive sleeve and the housing 10.

Figure 4:
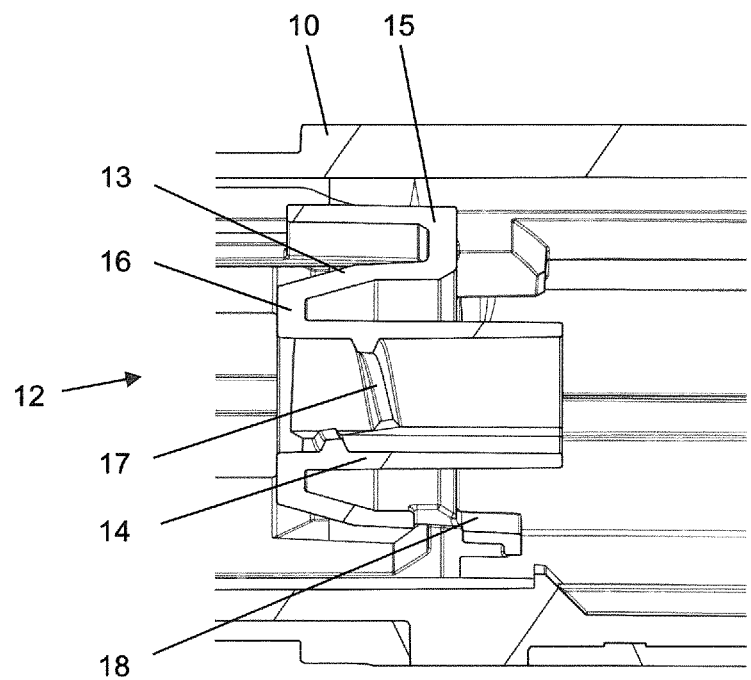
FIG. 4 shows, in a sectional view, a detail of a device according to another embodiment.

In the embodiment of FIG. 4, the insert is an integral part of an inner housing shell which inner shell is partially surrounded by an external housing shell. The shells may be formed by two consecutive shots of injection moulding such that the shells are permanently attached to each other. For example, the inner shell is formed from a transparent or translucent material, whereas the outer shell is formed from an opaque material.

Figure 5A:
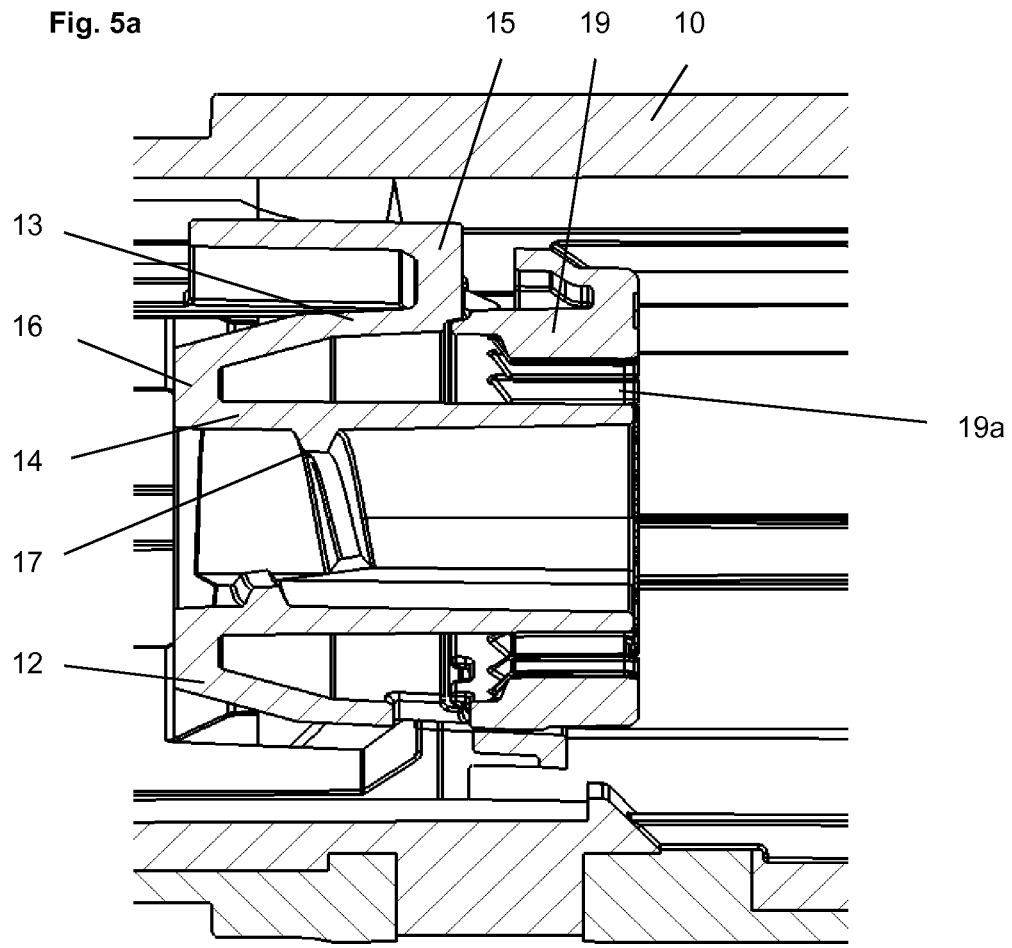
FIG. 5a shows, in a sectional view, a detail of a device according to yet another embodiment of the present disclosure.
Figure 5B:
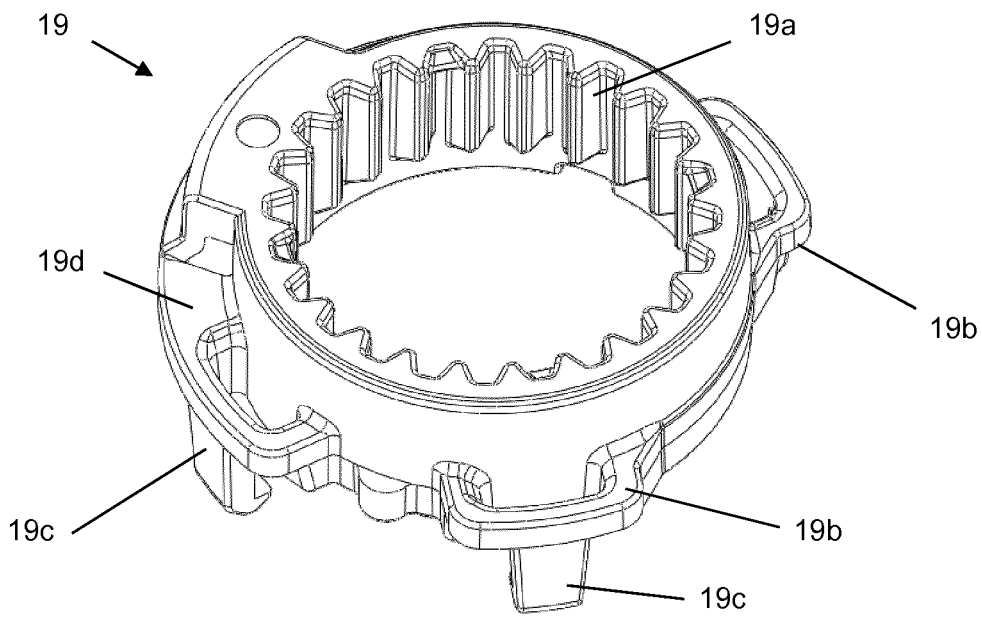

In the embodiment of FIGS. 5a and 5b, the insert 12 is partially formed as one single component part with the housing 10 and partially as a separate component part 19. The cup-shaped body 13 and the threaded tube 14 with the annular space for a compression spring are integrally formed with the housing 10 and connected thereto via arms 15, whereas the clutch feature (e.g., spline teeth 18) for rotationally constraining the drive sleeve 40 is a separate ring-shaped component part 19 which is axially and rotationally constrained to the housing 10. Thus, according to the embodiment of FIGS. 5a and 5b, the ring-shaped insert part 19 does not have the thread 17 as an integral part. As shown in FIG. 5b in more detail, the ring-shaped insert part 19 comprises axially orientated splines 19a on an inner surface to rotationally restrain the drive sleeve 40. The ring-shaped insert part 19 further comprises arms or splines 19b on its outer surface for rotational retention within the housing 10. Further, several hook-like arms 19c are provided to form a snap clip for axial retention of the ring-shaped insert part 19 within the housing 10. The ring-shaped insert part 19 comprises a hole or pocket 19d for receiving and fixing the hook end 91 of the drive spring 90. In addition, there are features on the ring-shaped insert part 19 that bias the insert parts 12, 19 axially and rotationally to remove free play.

The cartridge holder 20 is located at the distal side of housing 10 and may be permanently attached thereto. The cartridge holder may be a transparent or translucent component which is tubular to receive cartridge 100. The distal end of cartridge holder 20 may be provided with means for attaching a needle arrangement. A removable cap (not shown) may be provided to fit over the cartridge holder 20 and may be retained via clip features on the housing 10.

The piston rod 30 is rotationally constrained to the drive sleeve 40 via a splined interface. When rotated, the piston rod 30 is forced to move axially relative to the drive sleeve 40, through its threaded interface with the insert 12 of housing 10. The lead screw 30 is an elongate member with an outer thread engaging the corresponding thread of the insert 12 of housing 10. The interface comprises at least one longitudinal groove or track and a corresponding protrusion or spline of the drive sleeve 40. At its distal end, the lead screw 30 is provided with an interface for clip attachment of the bearing 140.

The drive sleeve 40 is a hollow member surrounding the lead screw 30 and arranged within number sleeve 60. It extends from an interface with the clutch plate 120 to the contact with the clutch spring 130. The drive sleeve 40 is axially movable relative to the housing 10, the piston rod 30 and the number sleeve 60 in the distal direction against the bias of clutch spring 130 and in the opposite proximal direction under the bias of clutch spring 130.

A splined tooth interface 18 with the insert 12 prevents rotation of the drive sleeve 40 during dose setting. This interface comprises a ring of radially extending outer teeth 41 at the distal end of drive sleeve 40 and corresponding radially extending inner teeth 18 of the housing component 10 (insert 12). When the button 70 is pressed (FIG. 3b), the drive sleeve 40 and the splined teeth interface 18 are disengaged allowing the drive sleeve 40 to rotate relative to the insert 12 and, thus, to housing 10. Clutch spring 130 biases the drive sleeve 40 into a position where the teeth 41 of the drive sleeve 40 engages with the teeth 18 of the insert 12 (FIG. 3a). A further splined tooth interface with the number sleeve 60 is not engaged during dialing, but engages when the button 70 is pressed, preventing relative rotation between the drive sleeve 40 and number sleeve 60 during dispense. In a preferred embodiment this interface comprises inwardly directed splines on a flange on the inner surface of the number sleeve 60 and a ring of radially extending outer splines of drive sleeve 40. These corresponding splines are located on the number sleeve 60 and the drive sleeve 40, respectively, such that axial movement of the drive sleeve 40 relative to the (axially fixed) number sleeve 60 engages or disengages the splines to rotationally couple or decouple the drive sleeve 40 and the number sleeve 60.

A further interface of the drive sleeve 40 comprises a ring of ratchet teeth located at the proximal end face of drive sleeve 40 and a ring of corresponding ratchet teeth on the clutch plate 120.

The driver 40 has a threaded section providing a helical track for the nut 50. In addition, a last dose abutment or stop is provided which may be the end of the thread track or preferably a rotational hard stop for interaction with a corresponding last dose stop of nut 50, thus limiting movement of the nut 50 on the driver thread. At least one longitudinal spline of the driver 40 engages a corresponding track of the lead screw 30.

The last dose nut 50 is located between the number sleeve 60 and the drive sleeve 40. It is rotationally constrained to the number sleeve 60, via a splined interface. It moves along a helical path relative to the drive sleeve 40, via a threaded interface, expediently established by means of the helical track, when relative rotation occurs between the number sleeve 60 and drive sleeve 40 which, for the presently described mechanism is during dialing or setting only, where dose dialing refers to a dose setting operation. As an alternative, the nut 50 may be splined to the driver 40 and threaded to the number sleeve 60. A last dose stop is provided on nut 50 engaging a stop of drive sleeve 40 when a dose is set corresponding to the remaining dispensable amount of medicament or drug in the cartridge 100.

The dose indicator or number sleeve 60 is a tubular element. The number sleeve 60 is rotated during dose setting (via dose selector 80) and dose correction and during dose dispensing by torsion spring 90. Together with gauge element 110 the number sleeve 60 defines a zero position ('at rest') and a maximum dose position. Thus, the number sleeve 60 may be seen as a dose setting member.

For manufacturing reasons the number sleeve 60 of the embodiment shown in the Figures comprises a number sleeve lower 60a which is rigidly fixed to a number sleeve upper 60b during assembly to form the number sleeve 60. Number sleeve lower 60a and number sleeve upper 60b are separate components only to simplify number sleeve 60 mould tooling and assembly. As an alternative, the number sleeve 60 may be a unitary component. The number sleeve 60 is constrained to the housing 10 by snap engagement to allow rotation but not translation. The number sleeve 60 comprises an annular recess or groove near its distal end which engages a corresponding bead on an inner surface of the housing 10. The number sleeve lower 60a is marked with a sequence of numbers, which are visible through the gauge element 110 and the openings 11a, 11b in the housing 10, to denote the dialed dose of medicament.

Further, the number sleeve lower 60a has a portion with an outer thread engaging the gauge element 110. End stops are provided at the opposite ends of thread to limit relative movement with respect to the gauge element 110.

Clutch features which have the form of a ring of splines are provided inwardly directed on number sleeve upper 60b for engagement with splines of the button 70 during dose setting and dose correction. A clicker arm is provided on the outer surface of number sleeve 60 which interacts with the drive sleeve 40 and the gauge member 110 for generating a feedback signal. In addition, the number sleeve lower 60a is rotationally constrained to the nut 50 and to the clutch plate 120 via a splined interface comprising at least one longitudinal spline. Further, number sleeve lower 60a comprises an interface for attachment of the torsion spring 90.

The button 70 which forms the proximal end of the device is permanently splined to the dose selector 80. A central stem extends distally from the proximal actuation face of the button 70. The stem is provided with a flange carrying the splines for engagement with splines of the number sleeve upper 60b. Thus, it is also splined via splines to the number sleeve upper 60b when the button 70 is not pressed, but this spline interface is disconnected when the button 70 is pressed. The button 70 has a discontinuous annular skirt with splines. When the button 70 is pressed, splines on the button 70 engage with splines on the housing 10, preventing rotation of the button 70 (and hence the dose selector 80) during dispense. These splines disengage when the button 70 is released, allowing a dose to be dialed. Further, a ring of ratchet teeth is provided on the inner side of button flange for interaction with clutch plate 120.

The dose selector 80 is axially constrained to the housing 10. It is rotationally constrained, via the splined interface, to the button 70. This splined interface which includes grooves interacting with spline features formed by the annular skirt of button 70 remains engaged irrespective of the dose button 70 axial positions. The dose selector 80 or dose dial grip is a sleeve-like component with a serrated outer skirt.

The torsion spring 90 is attached at its distal end by a hook 91 to the insert 12 and, thus, to the housing 10 and at the other end to the number sleeve 60. The torsion spring 90 is located inside the number sleeve 60 and surrounds a distal portion of the drive sleeve 40. The torsion spring 90 is pre-wound upon assembly, such that it applies a torque to the number sleeve 60 when the mechanism is at zero units dialed. The action of rotating the dose selector 80, to set a dose, rotates the number sleeve 60 relative to the housing 10, and charges the torsion spring 90 further.

The cartridge 100 is received in cartridge holder 20. The cartridge 100 may be a glass ampoule having a moveable rubber bung at its proximal end. The distal end of cartridge 100 is provided with a pierceable rubber seal which is held in place by a crimped annular metal band. In the embodiment depicted in the Figures, the cartridge 100 is a standard 1, 5 ml cartridge. The device is designed to be disposable in that the cartridge 100 cannot be replaced by the user or health care professional. However, a reusable variant of the device could be provided by making the cartridge holder 20 removable and allowing backwinding of the lead screw 30 and the resetting of nut 50.

The gauge element 110 is constrained to prevent rotation but allow translation relative to the housing 10 via a splined interface. The gauge element 110 has a helical feature on its inner surface which engages with the helical thread cut in the number sleeve 60 such that rotation of the number sleeve 60 causes axial translation of the gauge element 110. This helical feature on the gauge element 110 also creates stop abutments against the end of the helical cut in the number sleeve 60 to limit the minimum and maximum dose that can be set.

The gauge element 110 has a generally plate or band like component having a central aperture or window and two flanges extending on either side of the aperture. The flanges are preferably not transparent and thus shield or cover the number sleeve 60, whereas the aperture or window allows viewing a portion of the number sleeve lower 60*a*. Further, gauge element 110 has a cam and a recess interacting with the clicker arm of the number sleeve 60 at the end of dose dispensing.

The clutch plate 120 is a ring-like component. The clutch plate 120 is splined to the number sleeve 60 via splines. It is also coupled to the drive sleeve 40 via a ratchet interface. The ratchet provides a detented position between the number sleeve 60 and drive sleeve 40 corresponding to each dose unit, and engages different ramped tooth angles during clockwise and anti-clockwise relative rotation. A clicker arm is provided on the clutch plate 120 for interaction with ratchet features of the button 70.

The clutch spring 130 is a compression spring. The axial position of the drive sleeve 40, clutch plate 120 and button 70 is defined by the action of the clutch spring 130, which applies a force on the drive sleeve 40 in the proximal direction. This spring force is reacted via the drive sleeve 40, clutch plate 120, and button 70, and when 'at rest' it is further reacted through the dose selector 80 to the housing 10. The spring force ensures that the ratchet interface between drive sleeve 40 and clutch plate 120 is always engaged. In the 'at rest' position, it also ensures that the button splines are engaged with the number sleeve splines, and the drive sleeve teeth are engaged with teeth of the housing 10.

The bearing 140 is axially constrained to the piston rod 30 and acts on the bung within the liquid medicament cartridge. It is axially clipped to the lead screw 30, but free to rotate.

With the device in the 'at rest' condition as shown in FIGS. 1 and 3*a*, the number sleeve 60 is positioned against its zero dose abutment with the gauge element 110 and the button 70 is not depressed. Dose marking '0' on the number sleeve 60 is visible through the window 11*b* of the housing 10 and gauge element 110, respectively.

The torsion spring 90, which has a number of pre-wound turns applied to it during assembly of the device, applies a torque to the number sleeve 60 and is prevented from rotating by the zero dose abutment.

The user selects a variable dose of liquid medicament by rotating the dose selector 80 clockwise, which generates an identical rotation in the number sleeve 60. Rotation of the number sleeve 60 causes charging of the torsion spring 90, increasing the energy stored within it. As the number sleeve 60 rotates, the gauge element 110 translates axially due to its threaded engagement thereby showing the value or size of the dialed dose, which may be a whole number multiple of a unit dosage increment or the minimum settable dose of the device, e.g. 1 IU or 5 IU. The gauge element 110 has flanges either side of the window area which cover the numbers printed on the number sleeve 60 adjacent to the dialed dose to ensure only the set dose number is made visible to the user.

A specific feature of this embodiment is the inclusion of a visual feedback feature in addition to the discrete dose number display typical on devices of this type. The distal end of the gauge element 110 creates a sliding scale through the small window 11*a* in the housing 10. As an alternative, the sliding scale could be formed using a separate component engaged with the number sleeve 60 on a different helical track.

As a dose is set by the user, the gauge element 110 translates axially, the distance moved proportional to the magnitude of the dose set. This feature gives clear feedback to the user regarding the approximate size of the dose set. The dispense speed of an auto-injector mechanism may be higher than for a manual injector device, so it may not be possible to read the numerical dose display during dispense. The gauge feature provides feedback to the user during dispense regarding dispense progress without the need to read the dose number itself. For example, the gauge display may be formed by an opaque element on the gauge element 110 revealing a contrasting colored component underneath. Alternatively, the revealable element may be printed with coarse dose numbers or other indices to provide more precise resolution. In addition, the gauge display simulates a syringe action during dose set and dispense.

The drive sleeve 40 is prevented from rotating as the dose is set and the number sleeve 60 rotated, due to the engagement of its splined teeth with teeth of the housing 10. Relative rotation must therefore occur between the clutch plate 120 and drive sleeve 40 via the ratchet interface.

The user torque required to rotate the dose selector 80 is a sum of the torque required to wind up the torsion spring 90, and the torque required to overhaul the ratchet interface. The clutch spring 130 is designed to provide an axial force to the ratchet interface and to bias the clutch plate 120 onto the drive sleeve 40. This axial load acts to maintain the ratchet teeth engagement of the clutch plate 120 and drive sleeve 40. The torque required to overhaul the ratchet in the dose set direction is a function of the axial load applied by the clutch spring 130, the clockwise ramp angle of the ratchet teeth, the friction coefficient between the mating surfaces and the mean radius of the ratchet interface.

As the user rotates the dose selector 80 sufficiently to increment the mechanism by one increment, the number sleeve 60 rotates relative to the drive sleeve 40 by one ratchet tooth. At this point the ratchet teeth re-engage into the next detented position. An audible click is generated by the ratchet re-engagement, and tactile feedback is given by the change in torque input required.

Relative rotation of the number sleeve 60 and the drive sleeve 40 is allowed. This relative rotation also causes the last dose nut 50 to travel along its threaded path, towards its last dose abutment on the drive sleeve 40.

With no user torque applied to the dose selector 80, the number sleeve 60 is now prevented from rotating back under the torque applied by the torsion spring 90, solely by the ratchet interface between the clutch plate 120 and the drive sleeve 40. The torque necessary to overhaul the ratchet in the anti-clockwise direction is a function of the axial load applied by the clutch spring 130, the anti-clockwise ramp angle of the ratchet, the friction coefficient between the mating surfaces and the mean radius of the ratchet features. The torque necessary to overhaul the ratchet must be greater than the torque applied to the number sleeve 60 (and hence clutch plate 120) by the torsion spring 90. The ratchet ramp angle is therefore increased in the anti-clockwise direction to ensure this is the case whilst ensuring the dial-up torque is as low as possible.

The user may now choose to increase the selected dose by continuing to rotate the dose selector 80 in the clockwise direction. The process of overhauling the ratchet interface between the number sleeve 60 and drive sleeve 40 is repeated for each dose increment. Additional energy is stored within the torsion spring 90 for each dose increment and audible and tactile feedback is provided for each increment dialed by the re-engagement of the ratchet teeth. The torque required to rotate the dose selector 80 increases as the torque required to wind up the torsion spring 90 increases. The torque required to overhaul the ratchet in the anti-clockwise direction must therefore be greater than the torque applied to the number sleeve 60 by the torsion spring 90 when the maximum dose has been reached.

If the user continues to increase the selected dose until the maximum dose limit is reached, the number sleeve 60 engages with its maximum dose abutment on the maximum dose abutment of gauge element 110. This prevents further rotation of the number sleeve 60, clutch plate 120 and dose selector 80.

Depending on how many increments have already been delivered by the mechanism, during selection of a dose, the last dose nut 50 may contact its last dose abutment with stop face of the drive sleeve 40. The abutment prevents further relative rotation between the number sleeve 60 and the drive sleeve 40, and therefore limits the dose that can be selected. The position of the last dose nut 50 is determined by the total number of relative rotations between the number sleeve 60 and drive sleeve 40, which have occurred each time the user sets a dose.

With the mechanism in a state in which a dose has been selected, the user is able to deselect or decrement any number of increments from this dose. Deselecting a dose is achieved by the user rotating the dose selector 80 anti-clockwise. The torque applied to the dose selector 80 by the user is sufficient, when combined with the torque applied by the torsion spring 90, to overhaul the ratchet interface between the clutch plate 120 and drive sleeve 40 in the anti-clockwise direction. When the ratchet is overhauled, anti-clockwise rotation occurs in the number sleeve 60 (via the clutch plate 120), which returns the number sleeve 60 towards the zero dose position, and unwinds the torsion spring 90. The relative rotation between the number sleeve 60 and drive sleeve 40 causes the last dose nut 50 to return along its helical path, away from the last dose abutment.

With the mechanism in a state in which a dose has been selected, the user is able to activate the mechanism to commence delivery of a dose. Delivery of a dose is initiated by the user depressing the button 70 axially in the distal direction (FIG. 3b).

When the button 70 is depressed, splines between the button 70 and number sleeve 60 are disengaged, rotationally disconnecting the button 70 and dose selector 80 from the delivery mechanism, i.e. from number sleeve 60, gauge element 110 and torsion spring 90. Splines on the button 70 engage with splines on the housing 10, preventing rotation of the button 70 (and hence the dose selector 80) during dispense. As the button 70 is stationary during dispense, it can be used in the dispense clicker mechanism. A stop feature in the housing 10 limits axial travel of the button 70 and reacts any axial abuse loads applied by the user, reducing the risk of damaging internal components.

The clutch plate 120 and drive sleeve 40 travel axially with the button 70. This engages the splined tooth interface between the drive sleeve 40 and number sleeve 60, preventing relative rotation between the drive sleeve 40 and number sleeve 60 during dispense. The splined tooth interface 18, 41 between the drive sleeve 40 and the housing insert 12 disengages, so the drive sleeve 40 can now rotate and is driven by the torsion spring 90 via the number sleeve 60, and clutch plate 120.

Rotation of the drive sleeve 40 causes the piston rod 30 to rotate due to their splined engagement, and the piston rod 30 then advances due to its threaded engagement to the housing 10. The number sleeve 60 rotation also causes the gauge element 110 to traverse axially back to its zero position whereby the zero dose abutment stops the mechanism.

Tactile feedback during dose dispense is provided via the compliant cantilever clicker arm integrated into the clutch plate 120. This arm interfaces radially with ratchet features on the inner surface of the button 70, whereby the ratchet tooth spacing corresponds to the number sleeve 60 rotation required for a single increment dispense. During dispense, as the number sleeve 60 rotates and the button 70 is rotationally coupled to the housing 10, the ratchet features engage with the clicker arm to produce an audible click with each dose increment delivered.

Delivery of a dose continues via the mechanical interactions described above while the user continues to depress the button 70. If the user releases the button 70, the clutch spring 130 returns the drive sleeve 40 to its 'at rest' or initial position (together with the clutch plate 120 and button 70), engaging the splines between the drive sleeve 40 and housing 10, preventing further rotation and stopping dose delivery.

During delivery of a dose, the drive sleeve 40 and number sleeve 60 rotate together, so that no relative motion in the last dose nut 50 occurs. The last dose nut 50 therefore travels axially relative to the drive sleeve 40 during dialing only.

Once the delivery of a dose is stopped, by the number sleeve 60 returning to the zero dose abutment, the user may release the button 70, which will re-engage the spline teeth between the drive sleeve 40 and housing 10. The mechanism is now returned to the 'at rest' condition.

At the end of dose dispensing, additional audible feedback is provided in the form of a 'click', distinct from the 'clicks' provided during dispense, to inform the user that the device has returned to its zero position via the interaction of the clicker arm on the number sleeve 60 with the ramp on the drive sleeve 40 and the cam and the recess on the gauge element 110. This embodiment allows feedback to only be created at the end of dose delivery and not created if the device is dialed back to, or away from, the zero position.

The drug delivery device discussed above is configured to deselect or decrement any number of dosage increments of a dose which has been set previously by incrementing the mechanism. The mechanism as disclosed above utilizes overhauling of a ratchet to decrease the set dose. This ratchet has to be able to withstand the continuously increasing torque exerted by the spring which increases with the size of the set dose, i.e. with the number of unit increments the dose comprises. Consequently, overhauling the ratchet may require significant force and/or generate significant noise.

When in the present disclosure it is referred to an "axial", "angular", "circumferential", or "radial" direction, the axis with respect to which these directions are specified may be an axis of the respective component or member, an axis of the housing, particularly a main longitudinal axis of the housing, the rotation axis around which the components or members rotate, and/or an axis of the drug delivery device, particularly the main longitudinal axis of the device. The axis may be oriented such that it extends through the proximal end and/or distal end of the device. Particularly, the proximal or distal direction may be parallel to and/or along the axis.

The housing is expediently static such that, if a component or member rotates and/or moves axially, it always moves relative to the housing. The components or members may be arranged such that they rotate about a common rotation axis. The rotation axis may extend through the respective member.

The drug delivery device which has been discussed above comprises the nut 50 as a tracking member which is displaced along a guide track on the driver or drive sleeve 40 when a dose is set by rotating the number sleeve or dose indicator 60. Thus, referrals to the nut above may be considered as referrals to the tracking member. Referrals to the guide member may be considered as referrals to the driver or drive sleeve 40. Referrals to the dose setting member may be considered as referring to the number sleeve 60 or the dose selector 80. However, if a mechanism of a different design is used, the number sleeve or dose indicator 60 may act as a dose setting member. It is even possible that the drive sleeve serves as dose setting member. The drive sleeve 40 preferably engages the piston rod directly. The button 70 may be used as or correspond to an actuation member which is used to initiate a dose dispensing operation as has been described previously when a dose has been set using the dose setting member. When the actuation member is moved by the user, the mechanism may be switched from the dose setting mode of operation into the dose dispensing mode of operation. By pressing the button, it is moved from a first or initial position to a second or dispense position which are axially, preferably only axially, offset from one another. When the button is released, it is moved back towards the initial position again. When the actuation member or button is released it is moved back into the initial position by a spring. In the mechanism discussed above, release of the button interrupts a dose dispensing procedure. Thus, the button has to be pressed during the entire dose dispensing procedure. The presently disclosed concepts do, however, also work for devices, where, once the button has been pressed, the dose is dispensed without the option of interrupting the dose delivery operation, e.g. via releasing the button.

The distance of the tracking member 50 from an end position as seen along the guide track or helical track of the driver 40 is characteristic for the amount of drug remaining in the cartridge 100 as has been discussed previously. The cartridge 100 comprises a cartridge body, e.g. of glass, and a bung which sealingly closes the proximal end of the cartridge body and, when moved towards the distal end of the cartridge body, dispenses liquid drug from the interior of the cartridge body through an opening in the cartridge or cartridge body, in particular when fluid communication is established between the interior of the cartridge and the exterior, e.g. by a needle unit. Without the needle, the distal end or dispensing end of the cartridge may be sealed by a septum. The septum may be pierceable by a needle of the needle unit which may be attached to a distal end of the cartridge holder 20. The cartridge holder 20 may be designed to receive the cartridge. The constituents of the cartridge are not explicitly shown in the drawings as is the needle unit.

As has been already discussed in the introductory section, the (end of the) content of the cartridge is tracked using the tracking member or nut 50, particular via its position along the guide track. It is advantageous to couple the tracking member to the dose setting and drive mechanism such that the tracking member is displaced relative to the guide track on the drive sleeve only after at least one or exactly one dose delivery operation of the dose setting drive mechanism has been initiated, i.e. the actuation member or button 70 has to be actuated at least once, e.g. has to be moved at least once to switch the mechanism from the dose setting mode of operation into the dose delivery mode of operation. Thus, the first dose setting operation can be used to adjust the position of the piston rod relative to the housing 10 in order to achieve a desired initial distance or gap between the distal end of the piston rod and the proximal end of the bung in the cartridge. This distance may be less than or equal to the distance corresponding to one unit increment of the settable doses. Setting a dose of one increment or a dose of the minimum settable size may involve a rotation of the dose setting member by less than or equal to 45°, e.g. less than or equal to 40°, and/or greater than or equal to 5°, e.g. greater than or equal to 10°, e.g. by 30° during dose setting. Thus, it is ensured that the initial distance is greater than zero but as small as possible such that the first dose can be exactly set by the user after the initial gap has been adjusted by the manufacturer. Also, overfilling of the cartridge is avoided as has been discussed already. The initial gap may be less than or equal to the distance by which the piston rod is displaced relative to the housing when the dose delivery operation for the minimum settable dose or for a dose of one unit dosage increment has been completed. The initial gap and/or the distance corresponding to one unit dosage increment may be greater than or equal to one of the following values: 0.1 mm, 0.2 mm, 0.3 mm, 0.4 mm. Alternatively or additionally, the initial gap and/or the distance corresponding to one unit dosage increment may be less than or equal to one of the following values: 2 mm, 1.5 mm, 1 mm, 0.5 mm.

Figure 6:
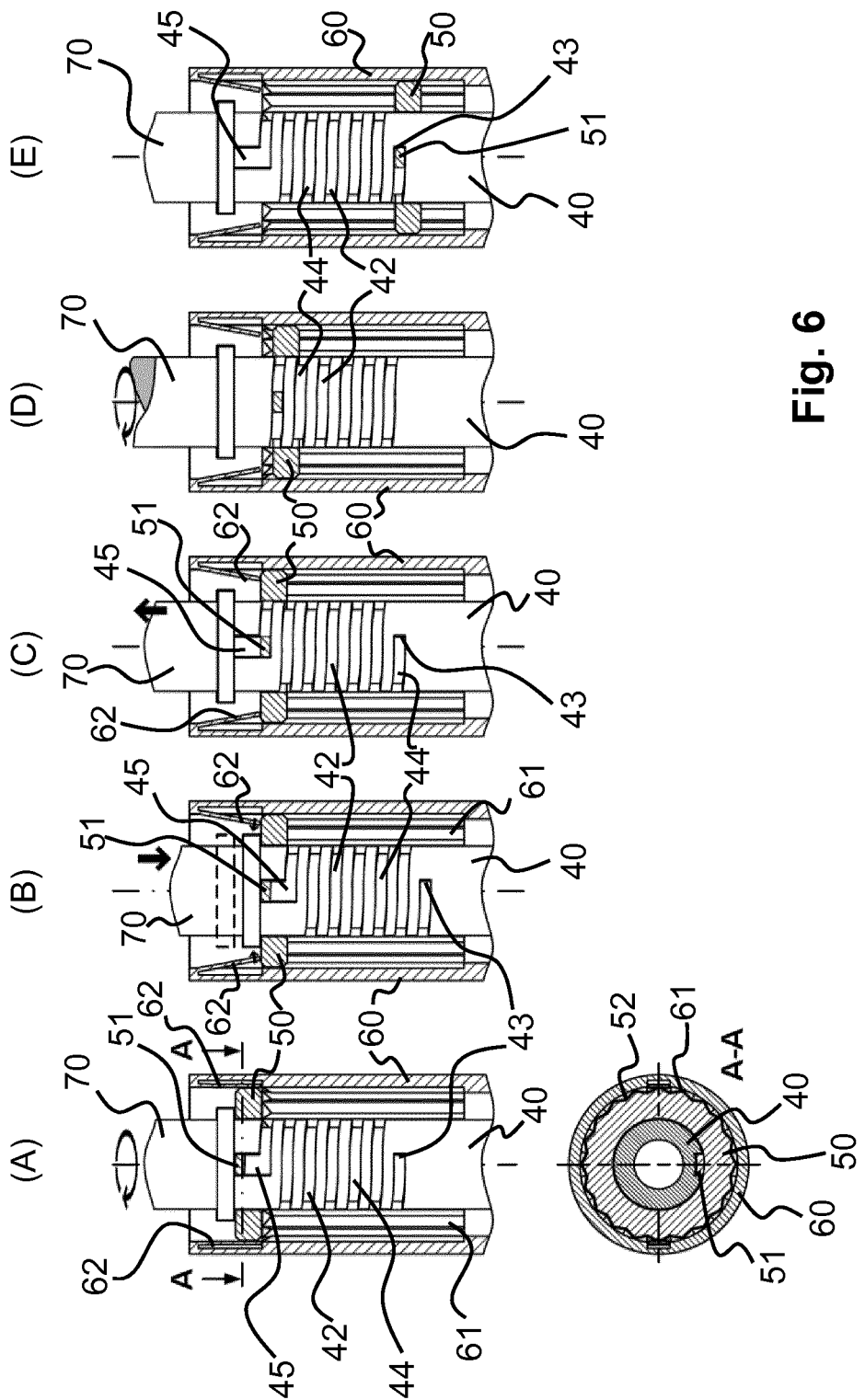
FIG. 6 illustrates an embodiment of a coupling mechanism suitable for the device of FIGS. 1 to 5b.

One embodiment of a coupling mechanism which is suitable for the device discussed above is discussed below in conjunction with FIG. 6 which schematically illustrates the operation of such a coupling mechanism on the basis of several representations—labelled A through E. In FIG. 6 schematic representations of the key components of the dose setting and drive mechanism are shown which are involved in coupling the tracking member to the dose setting and drive mechanism such that the tracking member is moved relative to the guide track during dose setting only after one dose delivery operation has been initiated. Any dose setting operation before the initiation of the (first) delivery operation does not affect the position of the tracking member along the guide track. In the representation of FIG. 6 the housing or body 10 is not shown for illustration purposes. Also, the piston rod is not explicitly shown. However any of and/or all of the components which were discussed above may be present in the discussed mechanism.

As is shown in FIG. 6, the guide member 40 (driver) is received within the dose setting member 60 (number sleeve). However, other arrangements are possible as well. Guide member and/or dose setting member may be a sleeve. The guide member 40 comprises a guide track 42. The guide track may be disposed on an exterior surface of the guide member. The tracking member 50 is provided to engage the guide track and also to travel towards and end position 43 relative to the guide track. The end position 43 is defined by or forms an end stop, expediently an angular end stop, in this embodiment. As is depicted, the guide track 42 comprises a helical thread or track 44. The guide track 42 may have an additional section, in addition to the helical track 44. In the depicted embodiment, the guide track 42 has an axially extending section or axial section 45, where the section 45 may be arranged proximally with respect to the helically threaded section, i.e. helical thread 44. The axial section 45 may lead into the helical thread 44. Thus, sections 44 and 45 may form a continuous track with different sections.

The representations A through E illustrate different states of the assembly. In representation A, the tracking member 50 is decoupled from the dose setting and drive mechanism, i.e.

the mechanism is in its initial or non-coupled state. The arrow indicates a rotation of the number sleeve/dose setting member 60 relative to the non-illustrated housing in order to set a dose to be delivered. The tracking member 50 is, via an engagement feature 51, e.g. a protrusion, preferably a radially oriented protrusion, coupled to, e.g. rotationally locked, relative to the guide track, e.g. to the guide member.

The tracking member 50 is disengaged from rotational locking features 61, e.g. axially extending splines, of the dose setting member 60. Thus, the dose setting member 60 rotates relative to the guide track, the guide member and/or the tracking member during dose setting in the situation in representation A. As the tracking member 50 engages the axially extending section 45 a rotational movement of the tracking member relative to the drive sleeve/guide member and/or guide track is prevented. The relative rotation may be even prevented, if, as depicted, the tracking member 50 frictionally engages a feature 62 of the dose setting member or number sleeve 60 which may transfer a force from the dose setting member 60 to the tracking member 50. Feature 62 may be a locking feature and be biased, e.g. radially and/or inwardly biased. The setting movement in representation A does not affect the relative position of the tracking member 50 relative to the guide track 42. In particular, the tracking member 50 is disengaged from the helical track 44 of the guide track 42.

The size of the dose which is set in representation A is expediently chosen such that the piston rod is displaced by a particular displacement distance relative to the housing during the subsequent dose delivery operation such that it assumes the desired position relative to the housing or a bung of a cartridge, when a cartridge unit is connected to the housing with that particular cartridge in the cartridge unit. It may be expedient to determine the bung position relative to the cartridge holder and/or the cartridge body before determining by which distance the piston rod should be displaced. The dose which is set is then chosen to bring the piston rod into a desired position relative to the bung, by means of the dose delivery operation. The cartridge unit and the housing are connected expediently by mutually corresponding connection features, e.g. for a form-fit connection, such as a threaded or bayonet connection. Particularly, the axial position of the respective connection feature may be fixed relative to the respective component and the area where the connection is established preferably cannot be shifted relative to the components to be connected. Thus, by using the dose setting and drive mechanism to adjust the position of the piston rod, a defined initial position, particularly a defined initial gap, of bung and piston rod can be achieved for a drug delivery device during assembling or manufacturing employing the dose setting and drive mechanism where the assembled device is then provided to the user or patient. Accordingly, in a set of drug delivery devices, the fluctuation in distances between the piston rod and the bung may be small, e.g. smaller than the fluctuations in the distance between a proximal surface of the bung and a proximal edge of the cartridge or cartridge body and/or smaller than the distance corresponding to one unit dosage increment and/or the values mentioned further above and/or below.

In representation B, the actuation member is actuated by the user, e.g. the button 70 is pressed. Again, the movement is indicated by the arrow. The actuation member 70 is moved from a first position from to a second position, where the second position is distally offset from the first position. This movement initiates or triggers the dose delivery operation of the dose setting and drive mechanism. While the button is depressed, the dose which was previously set is dispensed. As is apparent from the representation B, when the actuation member 70 is actuated, the guide member 40 and along with it the tracking member 50 is axially, e.g. distally displaced as well, in particular relative to the dose setting member 60.

The locking features 62 in representation A may be biased radially inwardly. Locking features 62 may be flexible arms or resiliently mounted arms or fingers which are biased radially, e.g. inwardly. In representation A the radial inward movement is prevented by the tracking member 50. Once the tracking member 50 has cleared the locking features 62 when it is displaced axially on account of the initiation of the dose delivery operation, a radial (inward) movement becomes possible and the locking feature(s) 62 move due to the bias. The locking feature(s) 62 moves(move) to a position where the respective feature radially overlaps with the tracking member, thereby preventing the tracking member from being moved into the proximal direction relative to the guide track, the guide member and/or the dose setting member. Also, during the movement of the actuation member 70 towards the first position the tracking member 50 is engaged with one or more of the rotational locking features 61 of the dose setting member 60.

When the actuation member 70 is released, it is moved back towards and/or into its first position on account of a spring such as clutch spring 130 as has been discussed previously. The tracking member 50 however stays in place, particularly on account of the locking features and/or on account of its engagement with the thread 44. This movement is indicated by the arrow in representation C, where the movement was already completed in representation C. Thus, the guide track and/or the guide member has been displaced axially relative to the tracking member in representation C or vice versa. The tracking member now has assumed its initial position along the helical thread or track 44. This representation shows the state of the device as delivered by the manufacturer, i.e. when the cartridge is still full.

The user may now start dose setting and delivery operations in subsequent regular operations of the dose setting and drive mechanism. Now the tracking member 50 is coupled to the dose setting and drive mechanism by way of engagement feature 51 and the rotational locking features 61 which engage corresponding features 52, e.g. circumferentially disposed and/or radially oriented teeth, on the tracking member 50.

The engagement feature 51 may protrude radially inwardly from the tracking member as is apparent from the sectional representation along line A-A in the bottom of representation A. The corresponding features 52 may protrude radially outwardly from the tracking member 50.

The rotational locking features 61 and/or the corresponding features 52 may be pitched according to the unit dosage increment. That is to say for each settable dose the coupling mechanism can be engaged when the dose delivery operation is initiated, e.g. when the actuation member is actuated for the first time. Particularly, two adjacent features 61 and/or 52, preferably any arbitrary two adjacent features 52 and/or 61, may be separated by the angle corresponding to one unit increment, i.e. the angle by which the dose setting member has to be rotated to set a dose of one unit dosage increment.

The initial position of the tracking member 50 along the guide track is the one depicted in representation C. The axial extension of the axially extending section 45 has to be adjusted to the axial distance between the first and the second position of the actuation member. In particular, the distance between a proximally facing surface of the engagement feature 51 and a distally facing surface which delimits the (helical) thread 44 is preferably be less than or equal to the distance between the first position and the second position. The former first position of the actuation member 70 is illustrated by the dashed line in representation B.

Representation D shows a subsequent dose setting operation, i.e. starting from the situation in representation C, when the device is in its condition as delivered. The rotation of the dose setting member 60 results in relative rotation of tracking member 50 and guide track as now, the tracking member is rotationally locked to the dose setting member and consequently follows rotation of the dose setting member. The guide track/guide member 40 preferably does not rotate relative to the housing during dose setting. The relative rotation between tracking member 50 and guide track 42 results in a displacement of the tracking member along the guide track or helical thread 44.

Representation E shows a situation where the engagement feature 51 has reached the end position of the guide track and, particularly abuts an end stop. Thus, in this position it is no longer possible to increase the size of the dose further. Decreasing the dose is still possible, preferably.

Instead of having possible switching positions for every dose which can be set, the rotational locking features 61 and/or the corresponding features 52 could also be pitched in an angle greater than the angle corresponding to one unit increment. Then, there may be only distinct settable doses which allow a switching of the dose setting and drive mechanism to the coupled state where the tracking member is coupled to the dose setting and drive mechanism. This may also have the desired effects, where, however, the finer the pitch the better as this allows a particular accurate adjustment of the initial gap between bung and piston rod during the assembling process.

The axial extension of the rotational locking features 61 is preferably at least as great as the sum of the axial extension of the helical track 44 and the distance by which the actuation member 70 is moved from the first position to the second position. This distance is, in the present design, unrelated to the set dose.

In this embodiment, the switching of the coupling mechanism from the non-coupled state depicted in representation A to the coupled state depicted in representations B, C, D, and E is performed at the beginning or with the initiation of a dose dispensing or delivery operation by transferring movement of the actuation member to the tracking member. The relative movement of the guide track and the tracking member for coupling the tracking member to the thread of the guide track is performed by the spring. However, it is also conceivable that the movement of the actuation member is used directly to displace the tracking member and the guide track relative to one another to couple the tracking member to the thread.

As an alternative, it would also be possible to rotationally lock the tracking member to both, the guide member and the dose setting member during dose setting when the mechanism is in the non-coupled state, where, in the coupled state, relative rotation between tracking member and guide track is allowed, expediently resulting in a relative displacement between the tracking member and the guide track. Then, the tracking member may be moved closer towards the end position as the set dose is increased.

Also, other configurations are possible, where it is avoided that the distance between the tracking member and the end position is reduced while a dose setting operation is performed when the mechanism is in its non-coupled state. The examples given herein are merely illustrative. Likewise, the guide track need not be provided on a movable member of the dose setting and drive mechanism. Rather, the guide track could also be provided on the housing.

Alternatively or additionally, it is possible to provide a coupling mechanism where the tracking member is decoupled from the guide track, e.g. freely rotatable relative to the guide track or the guide track is freely rotatable relative to the tracking member, in the non-coupled state. Then, the tracking member may be rotationally locked to the dose setting member in the non-coupled state. The tracking member and the guide track, which may be a helical track, may be moved relative to one another, e.g. axially, in order to switch the mechanism from the non-coupled state to the coupled state, wherein in the coupled state the tracking member engages the guide track. Then, in the coupled state, the distance of the tracking member from the end position along the guide track is reduced during dose setting by an amount indicative for the size of the set dose. In this solution, it is advantageous to have a plurality of lead-in features or sloped lead-in surfaces to allow engagement of the guide track and the tracking member in a plurality of relative rotational positions, e.g. assumed by the components for each settable dose or only a subset of settable doses. A multi-start thread may be suitable for this purpose.

Figure 7:
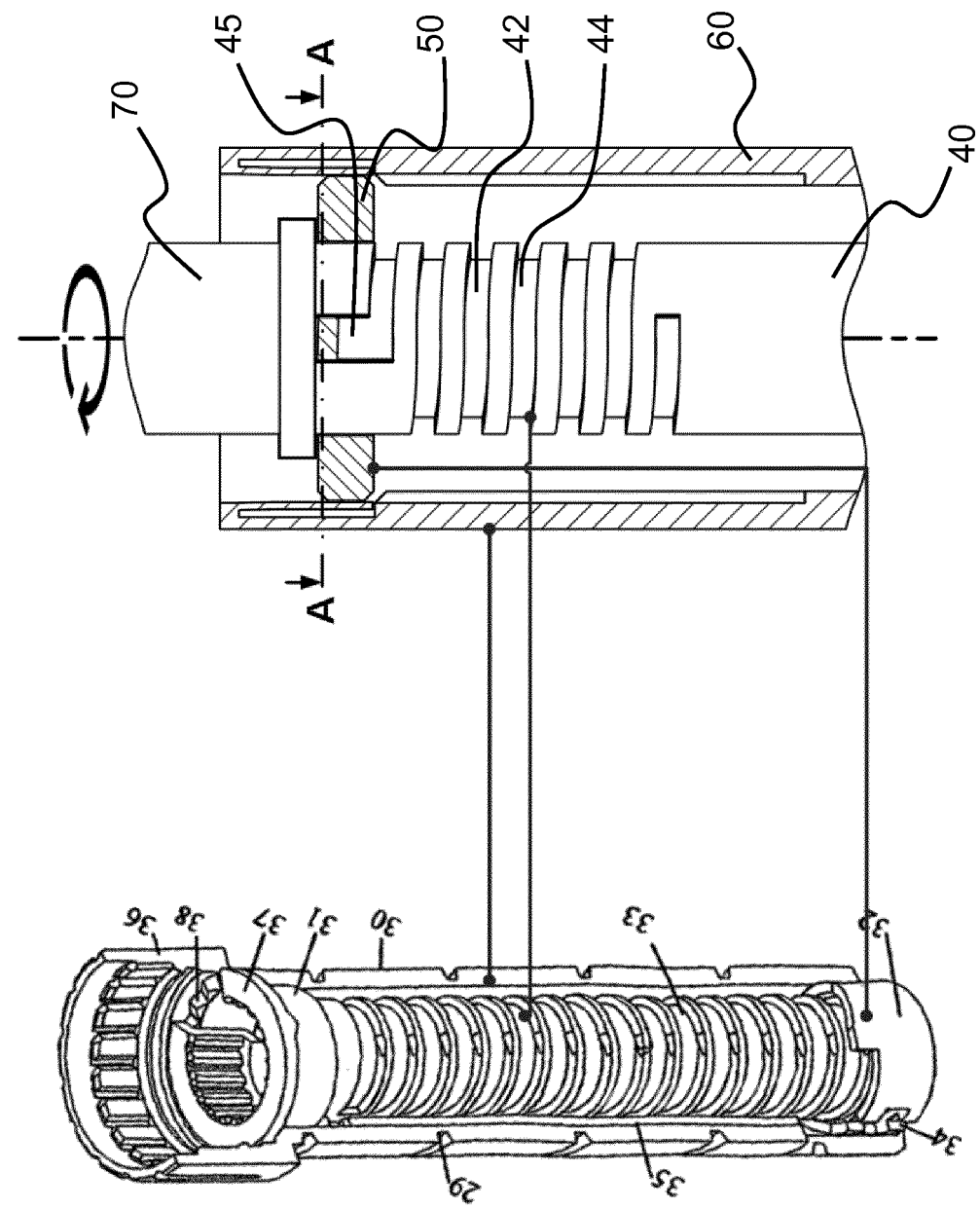
FIG. 7 illustrates that the coupling mechanism of FIG. 6 is also suitable for a different device.

FIG. 7 illustrates how the solution discussed above in connection with FIG. 6 can be implemented in a prior art device which is disclosed in EP 1 570 876 B1, which relates to the FlexPen, a device distributed by the company Novo Nordisk. As opposed to the solution in the prior art, the tracking member 50 has to be moved from the lowermost position in the left side of the drawing which depicts the solution for the end of cartridge content tracking mechanism in the current design of the prior art device to the proximal position in the right representation which reflects the solution proposed herein which, essentially, corresponds to what has been described above. Thus, the movement of the actuation member 70 can be transferred to the tracking member 50 in order to switch the coupling mechanism from the non-coupled state to the coupled state.

The lines extending from the left with the representation of the prior art device to the right indicate which element of the proposed solution corresponds to which element in the prior art device. The disclosure of EP 1 570 876 B1 is, as far as the function and other particulars regarding the device design are concerned, incorporated herein by reference. The left representation is taken from the prior art document, which is why the reference numerals do not reflect elements of the current disclosure but refer to the elements of the prior art document.

Thus, it is readily apparent that the solution presented in FIG. 6 is applicable for a wide range of drug delivery devices. Also, the other solutions sketched above are applicable over a wide range of devices.

FIGS. 8A and 8B illustrate yet another embodiment of a coupling mechanism which is suitable to be implemented in a drug delivery device. FIG. 8A shows the coupling mechanism in the non-coupled state, whereas FIG. 8B shows the mechanism in its coupled state. The figures are only a schematic representation of key components relevant for the operation of the coupling mechanism. Further components such as a piston rod, a dose indication member or number sleeve, and/or a cartridge containing drug are not explicitly shown for the purpose of better illustration. The mechanism comprises a dose setting member 150. In this embodiment, the dose setting member engages the piston rod (not explicitly shown). The piston rod may extend in the interior of the, e.g. sleeve-like, dose setting member 150. Thus, the dose setting member may act as a drive member in the present device. As drive member, it transfers the force to the piston rod during the dose delivery operation which force is used to move the piston rod distally. The dose setting member 150 comprises an inner thread 151. The inner thread 151 is configured to engage the piston rod, e.g. an external thread on the piston rod. The depicted assembly further comprises a housing 10 which is provided with a piston rod engagement feature 101 which is configured to engage the piston rod, e.g. a thread of the piston rod. The threads engaged with the engagement feature 101 and 150 may be different threads of the piston rod. The threads may be oppositely handed or have the same hand. The threads may have different leads and/or pitches. The thread of the piston rod engaging with the dose setting member 150 may have a greater pitch and/or lead than the thread of the piston rod engaging the engagement feature 101. The threads of the piston rod may be axially offset from one another. By means of the different threads a mechanical advantage can be achieved, which facilitates operation of the drug delivery device for a user as the force which the user has to supply is reduced. As opposed to the device discussed above, the present device, preferably, is entirely user-driven, i.e. the user has to generate the entire force required for the delivery operation. The dose setting and drive mechanism of this device may correspond to the one used in the SoloSTAR device as distributed by Sanofi-Aventis Deutschland GmbH. The general structure of that particular device is disclosed in WO 2004/078239 A1, the content of which, particularly regarding the details of the construction of the device and its components as well as its operation, is incorporated herein by reference.

For operating the device, the dose setting member 150 is rotated relative to the housing 10 for setting a dose, e.g. in a first direction. During dose setting, the dose setting member 150 may move proximally relative to the housing 10. Thus, the overall length of the device may increase during dose setting, e.g. in an amount proportional to the size of the set dose, which may be different from the device discussed further above in more detail, where the length does not change at all or at least not substantially. Once a dose has been set, the dose can be reduced by rotating the dose setting member in the second direction, opposite to the first direction, relative to the housing.

When an actuation member (button) is pressed by the user (not explicitly shown), the mechanism switches to the delivery mode. In the delivery mode, the dose setting member may be rotationally locked relative to the housing, e.g. by means of a clutch mechanism, but axially movable in the distal direction relative to the housing. The thread 151 is preferably a non-self-locking thread such that axial movement can be transferred to the piston rod and the piston rod is caused to rotate due to the axial load transferred to it. When the piston rod rotates, the piston rod is displaced axially in the distal direction, which is to the left in the present representation, on account of its engagement with the engagement feature 101.

The depicted assembly further comprises a tracking member 160, e.g. a nut. The tracking member 160 is configured to cooperate with and, preferably engaged with, a guide track 170, e.g. comprising or consisting of a thread, such as a helical thread. The tracking member may be engaged with the guide track, in particular the (helical) thread, in the coupled state and in the non-coupled state. The thread may be a single-start thread or a multi-start thread. The guide track 170 may be provided on a guide member 171. The tracking member is engaged with the guide track 150. Also, the tracking member 160 is engaged with a rotational locking feature 102, e.g. a spline feature, provided in the housing. Thus, the tracking member cannot rotate relative to the housing but is axially displaceable relative to the housing.

When the guide member 171 rotates relative to the housing 10 this causes relative rotation between the tracking member 160 and the guide track 170 which, in turn, results in a relative displacement of the tracking member and the guide track. The guide track may be moved such that the tracking member is positioned closer towards an end position along the guide track throughout dose setting and away from the end position during dose correcting. When the tracking member is in the end position, it may abut an end stop 175. In the end position, further rotation of the guide member in the first direction for increasing the set dose may be blocked as the tracking member is not rotatable due to its connection to the housing. Then, the set dose can no longer be increased further. In an alternative configuration, the tracking member may be threadedly engaged with the housing and splined to a tracking member carrier member movable relative to the housing in the same manner as the guide member discussed above. The guide track then, however, is provided on the housing.

In the non-coupled state depicted in FIG. 8A, the dose setting member 150 is rotationally decoupled from the guide member 171. The dose setting member 150 is, preferably freely, rotatable relative to the guide member. Accordingly, in the non-coupled state, the dose setting member 150 may rotate relative to the guide member 171 and/or the tracking member 160 and/or the guide track 170, especially during dose setting.

The guide member 171 and the dose setting member 150 may be, preferably releasably, axially locked to one another in the non-coupled state. Thus, the dose setting member, when axially displaced may carry the guide member along with it. For this purpose, one or more locking features 152 of the dose setting member, such as radially outwardly protruding snap features which are preferably resilient and/or resiliently displaceable radially and/or inwardly, may be provided on the dose setting member. The locking features 152 may engage one or more corresponding locking features 172 provided on the guide member, e.g. one, preferably circumferentially extending, recess or ring, which expediently allows a full rotatability by 360° or more of the dose setting member 150 relative to the guide member 171. Thus, during dose setting in the non-coupled state the dose setting member may rotate and carry the guide member 171 along due to the axial connection when the dose setting member is displaced in the proximal direction relative to the housing. The dose setting movement, however, does not affect the relative position of the tracking member 160 along the guide track 170 as the tracking member 160 and/or the guide track/guide member is rotationally decoupled from the dose setting member 150 in the non-coupled state.

The locking features 152 are preferably axial locking features, i.e. features configured to establish an axial locking between two members, where the lock may be releasable. The dose setting member 150 further comprises one or a plurality of rotational locking features 153, e.g. one or more ribs which extend axially. The ribs may have a radial free end. The guide member 171 may have a corresponding locking feature 173, e.g. mating ribs.

Locking features 173 and 153 are configured to cooperate, e.g. engage one another, to establish a rotational lock as a coupling interface. When the rotational lock is established, the guide member 171 and the dose setting member 170 rotate together, preferably without relative rotational movement being possible between these two members. In the non-coupled state, the rotational locking features 173 and 153 are disengaged, e.g. as they are axially offset from each other.

When a dose has been set, which may be the case in the situation depicted in FIG. 8A, and a subsequent dose dispensing operation is commenced, the dose setting member and the guide member (e.g. due to the axial coupling provided therebetween) are moved in the distal direction relative to the housing 10, i.e. to the left in FIG. 8A. During the movement of the dose setting member 150 and the guide member 171 in the distal direction relative to the housing 10 at some stage, the guide member 171 hits a distal end stop 103, which prevents further distal movement of the guide member 171. In the depicted embodiment, the distal end stop 103 is formed by the structure which carries the engagement feature 101. However, it should be appreciated that the end stop could be formed by other structures as well. When the guide member 171 hits the distal end stop, it can no longer move in the distal direction relative to housing 10. The dose setting member 150, however, is still movable relative to the guide member and the end stop. As the dose setting member 150 is moved further on in the distal direction relative to the housing and relative to the guide member, the rotational locking features 153 and 173 are brought into engagement. Also, the axial locking features 152 and 172 disengage. The features 152 may be flexed inwardly during this process.

Once the dose setting member 150 has moved by a predetermined distance, which may be determined by the distance between the locking feature 172 and a further locking feature 174, relative to the guide member 171, the locking features 152 engage with the locking feature 173. The locking feature 174 and the locking feature 152 may establish an, preferably irreleasable or permanent, axial lock between the guide member 171 and the dose setting member. The locking feature 174 may be or may comprise one, preferably circumferentially extending, recess or ring. Thus, an axial lock may be established in any relative angular position between the guide member 171 and the dose setting member 150. At the end of the dose delivery operation, i.e. the situation depicted in FIG. 8B, the assembly has been switched into the coupled state. Thus, in the coupled state, the dose setting member 150 and the guide member 171 are axially locked—by cooperation of the axial locking features 174 and 152—and rotationally locked—by cooperation of the locking features 153 and 174. Instead of having two different locking interfaces, one for the axial lock and one for the rotational lock, it is conceivable that a combined rotational and axial locking interface could be realized, e.g. by locking features 174 and 152. Having separate interfaces for the axial lock and the rotational lock may nevertheless be advantageous, e.g. from a manufacturing perspective or regarding reliability, as the load may be distributed more widely between different interface features.

The possible relative rotational or angular positions between the guide member and the dose setting member in which the rotational locking is possible by relative axial movement between the two members depend on the configuration and/or arrangement, e.g. the angular pitch, of the rotational locking features establishing the rotational lock. The locking features 153, 173 may be circumferentially disposed. The pitch of the features may be chosen to enable switching for every settable dose, i.e. it may correspond to the angle corresponding to one unit dosage increment or only for a subset of the settable of doses, preferably more than 5, 6, 7 or 8 settable doses. In this mechanism, in contrast to the mechanism discussed in FIG. 6, the switching from the non-coupled state to the coupled state occurs at the end of the dose delivery operation, e.g. when the most distal arranged member hits a distal end stop and the other one is moved further until the two members rotationally and axially interlock.

The solution discussed above has the advantage that the relative rotational or angular position between the tracking member and the guide track is not changed during dose setting in the non-coupled state. It is, however, also possible to have a mechanism, where, in the non-coupled state, there is relative rotation between the guide track and the tracking member. One option for realizing a coupling mechanism is, in this case, if the tracking member is disengaged from the guide track in the non-coupled state and engaged with the guide track in the coupled state. In this case, it should be ensured that, e.g. at least in the relative angular positions corresponding to the switchable doses of the mechanism, the tracking member can be brought into engagement with the guide track which may be or may comprise a helical thread. For example, such a mechanism may be realized by a free-run region with which the tracking member is engaged in the non-coupled state, the free-run region being axially offset from the guide track. The free-run region may be formed as a circumferentially extending nut, for example where the guide track or a guide member with the guide track may be rotated relative to the tracking member without involving axial displacement of the tracking member relative to the guide track while the tracking member is guided in the free-run region. When the set dose is dispensed, the tracking member may be moved relative to the guide track or the guide track relative to the tracking member such that the tracking member is engaged with the guide track. This may be done, for example, by means of a pin or other protruding portion inside of the housing which, preferably at the end of the dose delivery operation, engages the tracking member such that the guide member is moved relative to the tracking member, thereby engaging tracking member and guide track. In order to ensure that the engagement of the thread of the guide track is possible in a plurality of relative angular positions, a plurality of passages into the thread and/or associated lead-in surfaces which guide guiding features of the tracking member into engagement with thread. Also, a multi-start threat may be advantageous for this purpose. The respective thread may be a helical thread.

Another option—alternatively or additionally to the disengagement of the guide track/helical thread in the non-coupled state—is that the tracking member is disengaged from a splined or rotationally locked interface with a member which does not have the guide track, e.g. the housing, in the non-coupled state. The engagement may be established to switch to the coupled state. In the non-coupled state, the tracking member may be engaged or disengaged from the guide track.

In an embodiment, the coupling interface may be a rotationally locked interface, e.g. a splined interface. In the non-coupled state, a splined or rotationally locked interface may be established. Alternatively, in the non-coupled state, relative rotational movement, particularly free relative rotational movement may be possible between the guide track and the tracking member. Alternatively, the coupling interface may be a threaded interface. In the non-coupled state the threaded interface may be disengaged.

In the discussed embodiments, the number of switchable doses or angular coupling positions where the coupling interface can be established may be greater than or equal to one of the following values: 3, 4, 5, 6, 7, 8, 9, and 10, even when the number is smaller than the total number of different settable doses. The number of switchable doses may be less than or equal to one of the following values: 0.5 TD, 0.4 TD, 0.3 TD, 0.25 TD, where TD is the total number of settable doses, i.e. the number of doses settable between the minimum settable dose and the maximum settable dose. The maximum settable dose may be greater than 50 IU, such as 80 IU, for example.

In an embodiment, the concentration of drug or active pharmaceutical ingredient, e.g. insulin, in the cartridge or reservoir of the drug delivery device is greater than or equal to one of the following values: 150 IU per ml of liquid in the cartridge, 200 IU per ml of liquid in the cartridge, 250 IU per ml of liquid in the cartridge, 275 IU per ml of liquid in the cartridge, 300 IU per ml of liquid in the cartridge. Alternatively or additionally, the concentration may be less than or equal to one of the following values: 500 IU per ml of liquid in the cartridge, 450 IU per ml of liquid in the cartridge, 400 IU per ml of liquid in the cartridge, 350 IU per ml of liquid in the cartridge.

In an embodiment, in the drug delivery device, the initial distance, which is preferably greater than zero, between piston rod and bung, e.g. the distance before the first dose delivery operation is initiated by the user with the coupling mechanism being in its coupled state, such as by a user or patient to administer the drug or to prime the drug delivery device before the first use, is less than or equal to one of the following values:

the displacement distance determined by or corresponding to the smallest dose settable with the dose setting and drive mechanism of the assembly in a dose setting operation, e.g. less than the displacement distance corresponding to one unit dosage increment or the minimum settable dose, and/or the smallest dose settable with the dose setting and drive mechanism of the assembly in a dose setting operation which allows a switching of the coupling mechanism from the non-coupled state to the coupled state, i.e. the distance corresponding to the smallest switchable dose the displacement distance determined by or corresponding to N unit dosage increments, where N is an arbitrary one of the following values: 1, 2, 3, 4, 5, 6, 7, 8, 9, 10, 11, 12, 13, 14, 15, 16, 17, 18, 19, 20.

In an embodiment, alternatively or additionally to the previous embodiment, the initial distance between the piston rod and the bung is greater than or equal to one of the following values:

the displacement distance determined by or corresponding to N unit dosage increments, where N is an arbitrary one of the following values: 1, 2, 3, 4, 5, 6, 7, 8, 9, 10, 11, 12, 13, 14, 15, 16, 17, 18, 19, 20; and/or 0.2 mm, 0.5 mm, 1 mm, 1.5 mm, 3 mm.

Specifically, the initial distance may be between the displacement distance corresponding to a dose of one unit dosage increment and the one corresponding to a dose of 20 unit dosage increments, e.g. between the distances corresponding to a dose of one unit dosage increment and three unit dosage increments.

If the initial distance is chosen to be greater than the distance corresponding to one unit dosage increment, it can be guaranteed that there will be no contact between piston rod and bung tin the initial state of the device, i.e. when the device has not been primed by the user. This avoids that there will be mechanical stress in the device between the cartridge unit and the piston rod of the housing unit, when the device is in the initial state. If the initial distance is less than one of the values recited above, it can be achieved that the amount, by which the cartridge has to be overfilled is still tolerable. Preferably, the initial distance is less than the distance corresponding to five unit dosage increments, three unit dosage increments, or two unit dosage increments. The device can then be primed by setting a dose of a certain number of, e.g. two or three, unit dosage increments and dispense the dose. If liquid is expelled from the device, the priming was successful In an embodiment, the set of drug delivery devices may comprise a plurality of drug delivery devices, e.g. as described further above. The devices may have the same construction, e.g. part count, couplings between the parts, and/or design of the parts, may be provided to deliver the same drug, may have cartridges with the same filling level or volume and/or may have equivalent dose setting and drive mechanisms which for every particular dose which is set in dose setting operations in the different devices displace the piston rods by the same distances. All of the devices in the set may have an initial distance or gap between piston rod and bung which is less than or equal to and/or greater than or equal to one of the values cited further above. The set may comprise 10 or more drug delivery devices, such as 50 or more, 100 or more or 1000 or more drug delivery devices.

Alternatively or additionally, the variation of the distance of the proximal surface of the bung from the proximal edge or rim of the cartridge body may be greater than the variation in the initial gap, particularly as taken over all devices of the set.

For example, the difference $\Delta_{Gap,max/min}$ between the maximum of the distances of the piston rod from the bung taken over all the devices of the set, i.e. the maximum initial gap of the set, and the minimum of the distances of the piston rod from the bung taken over all the devices of the set, i.e. the minimum initial gap of the set, may be less than or equal to one of the following values: D1, D2, D3, D4, D5, D6, D7, D8, D9, D10, $\Delta_{Bung,max/min}$, $0.9\Delta_{Bung,max/min}$, $0.8\Delta_{Bung,max/min}$, $0.7\Delta_{Bung,max/min}$, $0.6\Delta_{Bung,max/min}$, $0.5\Delta_{Bung,max/min}$, $0.4\Delta_{Bung,max/min}$, $0.3\Delta_{Bung,max/min}$, $0.2\Delta_{Bung,max/min}$, $0.1\Delta_{Bung,max/min}$, $0.05\Delta_{Bung,max/min}$. Here, DX (X=1 to 10) may be the displacement distance by which the piston rod is displaced distally during a delivery operation relative to the position it had before the dose setting operation has been performed to dispense a dose of X unit dosage increments during the dose delivery operation. DX may be the displacement distance corresponding to a dose of X unit dosage increments. $\Delta_{Bung,max/min}$ may be the difference between the maximum of the distances of the bung from the proximal end of the cartridge body taken over all the devices of the set, i.e. the bung, of which the proximal end is furthest away from the proximal end of the cartridge body of all cartridges in the set, and the minimum of the distances of the bung from the proximal end of the cartridge body taken over all the devices of the set, i.e. the bung of which the proximal end is positioned closest to, but preferably still distally offset from, the proximal end of the cartridge body of all cartridges in the set. All devices of the set may have an initial gap or initial distance greater than or equal to D1.

The devices discussed above, preferably, are disposable drug delivery devices. Here, the advantage of adjusting the initial gap before coupling the tracking member to the dose setting and drive mechanism is particularly huge.

The term "medication", "medicament" or "drug", as used herein, preferably means a pharmaceutical formulation containing at least one pharmaceutically active compound, wherein in one embodiment the pharmaceutically active compound has a molecular weight up to 1500 Da and/or is a peptide, a protein, a polysaccharide, a vaccine, a DNA, a RNA, an enzyme, an antibody or a fragment thereof, a hormone or an oligonucleotide, or a mixture of the above-mentioned pharmaceutically active compound, wherein in a further embodiment the pharmaceutically active compound is useful for the treatment and/or prophylaxis of diabetes mellitus or complications associated with diabetes mellitus such as diabetic retinopathy, thromboembolism disorders such as deep vein or pulmonary thromboembolism, acute coronary syndrome (ACS), angina, myocardial infarction cancer, macular degeneration, inflammation, hay fever, atherosclerosis and/or rheumatoid arthritis, wherein in a further embodiment the pharmaceutically active compound comprises at least one peptide for the treatment and/or prophylaxis of diabetes mellitus or complications associated with diabetes mellitus such as diabetic retinopathy, wherein in a further embodiment the pharmaceutically active compound comprises at least one human insulin or a human insulin analogue or derivative, glucagon-like peptide (GLP-1) or an analogue or derivative thereof, or exendin-3 or exendin-4 or an analogue or derivative of exendin-3 or exendin-4.

Insulin analogues are for example Gly(A21), Arg(B31), Arg(B32) human insulin; Lys(B3), Glu(B29) human insulin; Lys(B28), Pro(B29) human insulin; Asp(B28) human insulin; human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Insulin derivates are for example B29-N-myristoyl-des (B30) human insulin; B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-Y-glutamyl)-des(B30) human insulin; B29-N—(N-lithocholyl-Y-glutamyl)-des(B30) human insulin; B29-N-(ω-carboxyheptadecanoyl)-des(B30) human insulin and B29-N-(ω-carboxyheptadecanoyl) human insulin.

Exendin-4 for example means Exendin-4(1-39), a peptide of the sequence H-His-Gly-Glu-Gly-Thr-Phe-Thr-Ser-Asp-Leu-Ser-Lys-Gln-Met-Glu-Glu-Glu-Ala-Val-Arg-Leu-Phe-Ile-Glu-Trp-Leu-Lys-Asn-Gly-Gly-Pro-Ser- Ser-Gly-Ala-Pro-Pro-Pro-Ser-NH2.

Exendin-4 derivatives are for example selected from the following list of compounds:

H-(Lys)4-des Pro36, des Pro37 Exendin-4(1-39)-NH2,
H-(Lys)5-des Pro36, des Pro37 Exendin-4(1-39)-NH2,
des Pro36 Exendin-4(1-39),
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4 (1-39); or
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4 (1-39), wherein the group -Lys6-NH2 may be bound to the C-terminus of the Exendin-4 derivative;

or an Exendin-4 derivative of the sequence
des Pro36 Exendin-4(1-39)-Lys6-NH2 (AVE0010),
H-(Lys)6-des Pro36 [Asp28] Exendin-4(1-39)-Lys6-NH2,
des Asp28 Pro36, Pro37, Pro38Exendin-4(1-39)-NH2,
H-(Lys)6-des Pro36, Pro38 [Asp28] Exendin-4(1-39)-NH2,
H-Asn-(Glu)5des Pro36, Pro37, Pro38 [Asp28] Exendin-4(1-39)-NH2,
des Pro36, Pro37, Pro38 [Asp28] Exendin-4(1-39)-(Lys)6-NH2,
H-(Lys)6-des Pro36, Pro37, Pro38 [Asp28] Exendin-4(1-39)-(Lys)6-NH2,
H-Asn-(Glu)5-des Pro36, Pro37, Pro38 [Asp28] Exendin-4(1-39)-(Lys)6-NH2,
H-(Lys)6-des Pro36 [Trp(O2)25, Asp28] Exendin-4(1-39)-Lys6-NH2,
H-des Asp28 Pro36, Pro37, Pro38 [Trp(O2)25] Exendin-4(1-39)-NH2,
H-(Lys)6-des Pro36, Pro37, Pro38 [Trp(O2)25, Asp28] Exendin-4(1-39)-NH2,
H-Asn-(Glu)5-des Pro36, Pro37, Pro38 [Trp(O2)25, Asp28] Exendin-4(1-39)-NH2,
des Pro36, Pro37, Pro38 [Trp(O2)25, Asp28] Exendin-4 (1-39)-(Lys)6-NH2,
H-(Lys)6-des Pro36, Pro37, Pro38 [Trp(O2)25, Asp28] Exendin-4(1-39)-(Lys)6-NH2,
H-Asn-(Glu)5-des Pro36, Pro37, Pro38 [Trp(O2)25, Asp28] Exendin-4(1-39)-(Lys)6-NH2,
H-(Lys)6-des Pro36 [Met(O)14, Asp28] Exendin-4(1-39)-Lys6-NH2,
des Met(O)14 Asp28 Pro36, Pro37, Pro38 Exendin-4(1-39)-NH2,
H-(Lys)6-desPro36, Pro37, Pro38 [Met(O)14, Asp28] Exendin-4(1-39)-NH2,
H-Asn-(Glu)5-des Pro36, Pro37, Pro38 [Met(O)14, Asp28] Exendin-4(1-39)-NH2,
des Pro36, Pro37, Pro38 [Met(O)14, Asp28] Exendin-4 (1-39)-(Lys)6-NH2,
H-(Lys)6-des Pro36, Pro37, Pro38 [Met(O)14, Asp28] Exendin-4(1-39)-(Lys)6-NH2,
H-Asn-(Glu)5 des Pro36, Pro37, Pro38 [Met(O)14, Asp28] Exendin-4(1-39)-(Lys)6-NH2,
H-Lys6-des Pro36 [Met(O)14, Trp(O2)25, Asp28] Exendin-4(1-39)-Lys6-NH2,
H-des Asp28 Pro36, Pro37, Pro38 [Met(O)14, Trp(O2)25] Exendin-4(1-39)-NH2,
H-(Lys)6-des Pro36, Pro37, Pro38 [Met(O)14, Asp28] Exendin-4(1-39)-NH2,
H-Asn-(Glu)5-des Pro36, Pro37, Pro38 [Met(O)14, Trp(O2)25, Asp28] Exendin-4(1-39)-NH2,
des Pro36, Pro37, Pro38 [Met(O)14, Trp(O2)25, Asp28] Exendin-4(1-39)-(Lys)6-NH2,
H-(Lys)6-des Pro36, Pro37, Pro38 [Met(O)14, Trp(O2)25, Asp28] Exendin-4(S1-39)-(Lys)6-NH2,
H-Asn-(Glu)5-des Pro36, Pro37, Pro38 [Met(O)14, Trp(O2) 25, Asp28] Exendin-4(1-39)-(Lys)6-NH2;

or a pharmaceutically acceptable salt or solvate of any one of the afore-mentioned Exendin-4 derivative.

Hormones are for example hypophysis hormones or hypothalamus hormones or regulatory active peptides and their antagonists as listed in Rote Liste, ed. 2008, Chapter 50, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, Goserelin.

A polysaccharide is for example a glucosaminoglycane, a hyaluronic acid, a heparin, a low molecular weight heparin or an ultra low molecular weight heparin or a derivative thereof, or a sulphated, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium.

Antibodies are globular plasma proteins (~150 kDa) that are also known as immunoglobulins which share a basic structure. As they have sugar chains added to amino acid residues, they are glycoproteins. The basic functional unit of each antibody is an immunoglobulin (Ig) monomer (containing only one Ig unit); secreted antibodies can also be dimeric with two Ig units as with IgA, tetrameric with four Ig units like teleost fish IgM, or pentameric with five Ig units, like mammalian IgM.

The Ig monomer is a "Y"-shaped molecule that consists of four polypeptide chains; two identical heavy chains and two identical light chains connected by disulfide bonds between cysteine residues. Each heavy chain is about 440 amino acids long; each light chain is about 220 amino acids long. Heavy and light chains each contain intrachain disulfide bonds which stabilize their folding. Each chain is composed of structural domains called Ig domains. These domains contain about 70-110 amino acids and are classified into different categories (for example, variable or V, and constant or C) according to their size and function. They have a characteristic immunoglobulin fold in which two p sheets create a "sandwich" shape, held together by interactions between conserved cysteines and other charged amino acids.

There are five types of mammalian Ig heavy chain denoted by α, δ, ε, γ, and μ. The type of heavy chain present defines the isotype of antibody; these chains are found in IgA, IgD, IgE, IgG, and IgM antibodies, respectively.

Distinct heavy chains differ in size and composition; α and γ contain approximately 450 amino acids and δ approximately 500 amino acids, while μ and ε have approximately 550 amino acids. Each heavy chain has two regions, the constant region (CH) and the variable region (VH). In one species, the constant region is essentially identical in all antibodies of the same isotype, but differs in antibodies of different isotypes. Heavy chains γ, α and δ have a constant region composed of three tandem Ig domains, and a hinge region for added flexibility; heavy chains μ and ε have a constant region composed of four immunoglobulin domains. The variable region of the heavy chain differs in antibodies produced by different B cells, but is the same for all antibodies produced by a single B cell or B cell clone. The variable region of each heavy chain is approximately 110 amino acids long and is composed of a single Ig domain.

In mammals, there are two types of immunoglobulin light chain denoted by λ and κ. A light chain has two successive domains: one constant domain (CL) and one variable domain (VL). The approximate length of a light chain is 211 to 217 amino acids. Each antibody contains two light chains that are always identical; only one type of light chain, κ or λ, is present per antibody in mammals.

Although the general structure of all antibodies is very similar, the unique property of a given antibody is determined by the variable (V) regions, as detailed above. More specifically, variable loops, three each the light (VL) and three on the heavy (VH) chain, are responsible for binding to the antigen, i.e. for its antigen specificity. These loops are referred to as the Complementarity Determining Regions (CDRs). Because CDRs from both VH and VL domains contribute to the antigen-binding site, it is the combination of the heavy and the light chains, and not either alone, that determines the final antigen specificity.

An "antibody fragment" contains at least one antigen binding fragment as defined above, and exhibits essentially the same function and specificity as the complete antibody of which the fragment is derived from. Limited proteolytic digestion with papain cleaves the Ig prototype into three fragments. Two identical amino terminal fragments, each containing one entire L chain and about half an H chain, are the antigen binding fragments (Fab). The third fragment, similar in size but containing the carboxyl terminal half of both heavy chains with their interchain disulfide bond, is the crystalizable fragment (Fc). The Fc contains carbohydrates, complement-binding, and FcR-binding sites. Limited pepsin digestion yields a single F(ab')2 fragment containing both Fab pieces and the hinge region, including the H—H interchain disulfide bond. F(ab')2 is divalent for antigen binding. The disulfide bond of F(ab')2 may be cleaved in order to obtain Fab'. Moreover, the variable regions of the heavy and light chains can be fused together to form a single chain variable fragment (scFv).

Pharmaceutically acceptable salts are for example acid addition salts and basic salts. Acid addition salts are e.g. HCl or HBr salts. Basic salts are e.g. salts having a cation selected from alkali or alkaline, e.g. Na+, or K+, or Ca2+, or an ammonium ion N+(R1)(R2)(R3)(R4), wherein R1 to R4 independently of each other mean: hydrogen, an optionally substituted C1-C6-alkyl group, an optionally substituted C2-C6-alkenyl group, an optionally substituted C6-C10-aryl group, or an optionally substituted C6-C10-heteroaryl group. Further examples of pharmaceutically acceptable salts are described in "Remington's Pharmaceutical Sciences" 17. ed. Alfonso R. Gennaro (Ed.), Mark Publishing Company, Easton, Pa., U.S.A., 1985 and in Encyclopedia of Pharmaceutical Technology.

Pharmaceutically acceptable solvates are for example hydrates.

Although the concepts have been discussed above with reference to specific assemblies or devices, the presently disclosed concepts can also be employed for other configurations than the ones explicitly described, e.g. configurations which become apparent for are covered by the features described in the introductory section, which, of course, can also be applied for the exemplary embodiments. The key aspect in each case is that, during the dose setting operation, the distance of the tracking member from the end position along the guide track is not reduced unless at least one dose delivery operation has been initiated.

The scope of protection is not limited to the examples given herein above. The invention is embodied in each novel characteristic and each combination of characteristics, which particularly includes every combination of any features which are stated in the claims, even if this feature or this combination of features is not explicitly stated in the claims or in the examples.

REFERENCE NUMERALS 10 housing (casing)
11a, b window 12 insert
13 sidewall
14 tube
15 arm
16 bottom wall
17 thread
18 spline teeth
19 ring-shaped second part
19a spline teeth
19b arm (spline)
19c arm (snap clip)
19d opening
20 cartridge holder
30 piston rod (lead screw)
40 drive sleeve (guide member)
41 spline teeth
42 guide track
43 end position
44 helical thread
45 axial section
50 nut
51 engagement feature
52 corresponding feature
60 dose setting member/number sleeve
60a number sleeve lower
60b number sleeve upper
61 rotational locking features
62 locking feature
70 button
80 dose selector
90 torsion spring
91 hook
100 cartridge
101 engagement feature
102 rotational locking feature
103 end stop
110 gauge element
120 clutch plate
130 clutch spring
140 bearing
150 dose setting member
151 thread
152 locking feature
153 rotational locking feature
160 tracking member
170 guide track
171 guide member
172 locking feature
173 locking feature
174 locking feature
175 end stop
I axis

The invention claimed is:

1. An assembly for a drug delivery device, comprising
a housing having a proximal end and a distal end;
a dose setting and drive mechanism comprising:
 a dose setting member which is moveable relative to the housing in a dose setting operation from an initial position to a dose set position in order to set a dose of drug; and
 a piston rod which, after the dose setting operation, is displaceable in a distal direction relative to the housing in a dose delivery operation of the dose setting and drive mechanism, wherein, during the dose delivery operation, the piston rod is displaced relative to the housing by a displacement distance which is determined by the set dose;
 a guide track;
 a tracking member which is configured to cooperate with the guide track; and
 a coupling mechanism which is configured to operatively couple the tracking member to the dose setting and drive mechanism, wherein the coupling mechanism has two different states, a coupled state and a non-coupled state;
wherein, in the coupled state, a coupling interface is established, wherein the tracking member is operatively coupled to the dose setting and drive mechanism via the coupling interface such that in the dose setting operation a distance between the tracking member and an end position of the tracking member along the guide track is reduced by an amount which is determined by the dose which is set in the dose setting operation; and
wherein, in the non-coupled state, the coupling interface is not established, wherein the coupling mechanism is configured to be switchable from the non-coupled state into the coupled state, and wherein the assembly is configured such that in order to enable switching from the non-coupled state to the coupled state at least one dose delivery operation of the dose setting and drive mechanism has to be initiated.

2. The assembly of claim 1, wherein the displacement distance is determined by a size of the set dose.

3. The assembly of claim 1, wherein the assembly is configured such that the coupling mechanism, after having switched into the coupled state, is constrained to the coupled state.

4. The assembly of claim 1, wherein the assembly is configured such that in the coupled state of the coupling mechanism, the tracking member is operatively coupled to the dose setting member via the coupling interface such that a movement of the dose setting member from the initial position to the dose set position results in relative displacement between the tracking member and the guide track towards the end position.

5. The assembly of claim 1, wherein the assembly is configured such that in the non-coupled state of the coupling mechanism, a movement of the dose setting member from the initial position to the dose set position does not change the distance of the tracking member from the end position as seen along the guide track.

6. The assembly of claim 1, wherein the coupling mechanism is configured to switch from the non-coupled state to the coupled state at the end of the first dose delivery operation.

7. The assembly of claim 1, wherein the coupling mechanism is configured to switch from the non-coupled state to the coupled state at the initiation of the first dose delivery operation.

8. The assembly of claim 1, wherein the dose setting member is rotatable relative to the housing in an incremented fashion in unit dosage increments for the dose setting operation such that each settable dose is a whole-number multiple of the unit dosage increment.

9. The assembly of claim 8, wherein the coupling mechanism is configured such that the switching from the non-coupled state into the coupled state is possible in different relative angular coupling positions between the dose setting member and the housing, wherein two adjacent angular coupling positions are separated by an angle which is defined by the unit dosage increment.

10. The assembly of claim 1, wherein the assembly comprises an actuation member, wherein the actuation member has to be manipulated in order to initiate the dose delivery operation, wherein the actuation member is movable from a first position, where the assembly is in a dose setting mode of operation, into a second position, where the assembly is in a dose delivery mode of operation.

11. The assembly of claim 10, wherein the second position is closer to the proximal end of the housing than the first position.

12. The assembly of claim 10, wherein the second position is axially offset from the first position in a direction towards the end position of the tracking member along the guide track.

13. The assembly of claim 10, wherein in the non-coupled state of the coupling mechanism, a movement of the actuation member from the first position to the second position is transferable to the tracking member in order to switch the coupling mechanism from the non-coupled state to the coupled state.

14. The assembly of claim 1, wherein the guide track comprises a helical thread, wherein the tracking member is engaged with the helical thread in the coupled state and disengaged from the helical thread in the non-coupled state.

15. The assembly of claim 14, wherein the assembly is configured such that in the non-coupled state of the coupling mechanism, the tracking member is engaged with an axially extending section of the guide track, wherein the axially extending section leads into the helical thread.

16. The assembly of claim 1, wherein the assembly is configured such that in the non-coupled state of the coupling mechanism, the dose setting member is rotatable relative to the tracking member and relative to the guide track.

17. The assembly of claim 1, wherein in the coupled state of the coupling mechanism, the dose setting member is rotationally locked to the tracking member during the dose setting operation.

18. The assembly of claim 1, wherein when the coupling mechanism is in the coupled state, the dose setting member is rotationally locked to a guide member including the guide track during the dose setting operation.

19. The assembly of claim 1, wherein the assembly is configured such that in the non-coupled state of the coupling mechanism, the tracking member is rotationally locked to a guide member with the guide track, and wherein when the coupling mechanism is in the coupled state one of the tracking member and the guide member rotates relative to the other one of the tracking member and the guide member when the dose setting member is rotated for setting a dose in the dose setting operation.

20. A drug delivery device comprising the assembly of claim 1, wherein the coupling mechanism is in the coupled state, the drug delivery device further comprising a cartridge unit, the cartridge unit comprising a cartridge, the cartridge comprising a drug and a bung movably retained in a cartridge body of the cartridge, wherein an initial distance or gap between the piston rod and the bung is greater than or equal to another displacement distance determined by or corresponding to the smallest dose settable with the dose setting and drive mechanism of the assembly in the dose setting operation.

21. The drug delivery device of claim 20, wherein the other displacement distance corresponds to one unit dosage increment.

22. A method of producing a drug delivery device, the method comprising the following steps:
providing a cartridge unit, the cartridge unit comprising a cartridge containing a drug, wherein a bung is movably retained in a cartridge body of the cartridge;
providing a housing unit, which comprises:
a housing having a distal end and a proximal end,
a dose setting and drive mechanism comprising:
a dose setting member, which is moveable relative to the housing for a dose setting operation from an initial position to a dose set position in order to set a dose of drug; and
a piston rod which, after the dose setting operation, is displaceable in a distal direction relative to the housing in a dose delivery operation of the dose setting and drive mechanism, wherein, during the delivery operation, the piston rod is displaced relative to the housing by a displacement distance which is determined by the set dose;
a guide track;
a tracking member which is configured to cooperate with the guide track, the tracking member having an end position relative to the guide track, wherein a distance from the end position to the tracking member is indicative for an amount of drug remaining in the cartridge;
determining a bung position of the bung relative to the cartridge body;
determining, based on the determined bung position, a desired piston rod position of the piston rod relative to the housing, wherein the desired piston rod position is determined such that, if the housing unit and the cartridge unit are connected, the piston rod and the bung are arranged at a predetermined distance relative to one another;
determining a particular displacement distance by which the piston rod has to be displaced relative to the housing in the distal direction to be in the desired piston rod position;
moving the dose setting member relative to the housing to a dose set position to set a dose required to displace the piston rod relative to the housing by the particular displacement distance;
performing the dose delivery operation to displace the piston rod by the particular displacement distance to move the piston rod into the desired piston rod position relative to the housing;
during or after performing the dose delivery operation, operatively connecting the tracking member to the dose setting and drive mechanism such that when the next dose setting or delivery operation has been performed using the dose setting and drive mechanism, the tracking member is arranged closer to the end position along the guide track; and
after setting the dose required to displace the piston rod by the particular displacement distance, connecting the cartridge unit and the housing unit to one another for the drug delivery device.

23. An assembly for a drug delivery device, comprising
a housing having a proximal end and a distal end;
a dose setting and drive mechanism comprising:
a dose setting member which is moveable relative to the housing in a dose setting operation from an initial position to a dose set position in order to set a dose of drug; and
a piston rod which, after the dose setting operation, is displaceable in a distal direction relative to the housing in a dose delivery operation of the dose setting and drive mechanism, wherein, during the dose delivery operation, the piston rod is displaced relative to the housing by a displacement distance which is determined by the set dose;

a guide track;

a tracking member which is configured to cooperate with the guide track; and a coupling mechanism which is configured to operatively couple the tracking member to the dose setting and drive mechanism, wherein the coupling mechanism has two different states, a coupled state and a non-coupled state;

wherein, the coupling mechanism is established using at least one first coupling feature and at least one second coupling feature which do not engage one another in the non-coupled state but engage one another in the coupled state;

wherein, in the coupled state, a coupling interface is established, wherein the tracking member is operatively coupled to the dose setting and drive mechanism via the coupling interface such that in the dose setting operation a distance between the tracking member and an end position of the tracking member along the guide track is reduced by an amount which is determined by the dose which is set in the dose setting operation; and wherein, in the non-coupled state, the coupling interface is not established, wherein the coupling mechanism is configured to be switchable from the non-coupled state into the coupled state, and wherein the assembly is configured such that in order to enable switching from the non-coupled state to the coupled state at least one dose delivery operation of the dose setting and drive mechanism has to be initiated.

* * * * *